United States Patent
Komatsu et al.

(10) Patent No.: US 11,948,554 B2
(45) Date of Patent: Apr. 2, 2024

(54) LEARNING DEVICE AND PATTERN RECOGNITION DEVICE

(71) Applicant: NEC Corporation, Tokyo (JP)

(72) Inventors: Tatsuya Komatsu, Tokyo (JP); Reishi Kondo, Tokyo (JP); Sakiko Mishima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 485 days.

(21) Appl. No.: 17/276,192

(22) PCT Filed: Sep. 20, 2018

(86) PCT No.: PCT/JP2018/034848
§ 371 (c)(1),
(2) Date: Mar. 15, 2021

(87) PCT Pub. No.: WO2020/059084
PCT Pub. Date: Mar. 26, 2020

(65) Prior Publication Data
US 2022/0028372 A1    Jan. 27, 2022

(51) Int. Cl.
*G10L 15/16* (2006.01)
*G06N 20/00* (2019.01)
*G10L 15/02* (2006.01)
*G10L 15/06* (2013.01)
(Continued)

(52) U.S. Cl.
CPC ............ *G10L 15/063* (2013.01); *G06N 20/00* (2019.01); *G10L 15/02* (2013.01); *G10L 25/27* (2013.01); *G10L 25/51* (2013.01)

(58) Field of Classification Search
CPC ....... G10L 15/16; G10L 25/30; G10L 15/063; G10L 15/08; G06N 3/084; G06N 3/08; G06N 20/00; G06N 3/09; G06N 3/044
See application file for complete search history.

(56) References Cited

U.S. PATENT DOCUMENTS 9,886,954 B1 *  2/2018  Meacham ............ G10L 21/028
10,381,022 B1 *  8/2019  Chaudhuri ............ G10L 25/57
11,361,758 B2 *  6/2022  Baker .................... G06N 3/084
(Continued)

FOREIGN PATENT DOCUMENTS

JP  H08-297495 A  11/1996
JP  2004-287010 A  10/2004

OTHER PUBLICATIONS

International Search Report for PCT Application No. PCT/JP2018/034848, dated Nov. 13, 2018.
(Continued)

*Primary Examiner* — Olujimi A Adesanya

(57) ABSTRACT

The acoustic feature extraction means 82 extracts an acoustic feature, using predetermined parameters, from an acoustic pattern obtained as a result of processing on an acoustic signal. The language vector calculation means 83 calculates a language vector from a given label that represents an attribute of a source of the acoustic signal and that is associated with the acoustic pattern. The similarity calculation means 84 calculates a similarity between the acoustic feature and the language vector. The parameter update means 85 learns parameters so that the similarity becomes larger, and updates the predetermined parameters to the parameters obtained by learning.

7 Claims, 13 Drawing Sheets

(51) Int. Cl.
*G10L 25/27* (2013.01)
*G10L 25/51* (2013.01)

(56) References Cited

U.S. PATENT DOCUMENTS

| | | | | |
|---|---|---|---|---|
| 2010/0057452 | A1* | 3/2010 | Mukerjee | G10L 15/16 |
| | | | | 704/231 |
| 2011/0075851 | A1* | 3/2011 | LeBoeuf | G10L 25/51 |
| | | | | 381/56 |
| 2015/0221321 | A1* | 8/2015 | Christian | G10L 25/48 |
| | | | | 700/94 |
| 2017/0270919 | A1* | 9/2017 | Parthasarathi | G10L 17/06 |
| 2017/0323653 | A1* | 11/2017 | Hassan al Banna | |
| | | | | G10L 21/0216 |
| 2018/0068656 | A1* | 3/2018 | Lehman | G10L 15/1815 |
| 2019/0042881 | A1* | 2/2019 | Lopatka | G10L 25/24 |
| 2019/0050716 | A1* | 2/2019 | Barkan | G10L 25/48 |

OTHER PUBLICATIONS

Rui Lu, Zhiyao Duan, "Bidirectional Gru for Sound Event Detection", Detection and Classification of Acoustic Scenes and Event 2017, Nov. 16, 2017, Munich, Germany, [retrieved on Aug. 31, 2018], Internet, <URL:https://www.cs.tut.fi/sgn/arg/dcase2017/documents/challenge_technical_reports/DCASE2017_Lu_137.pdf>.

* cited by examiner

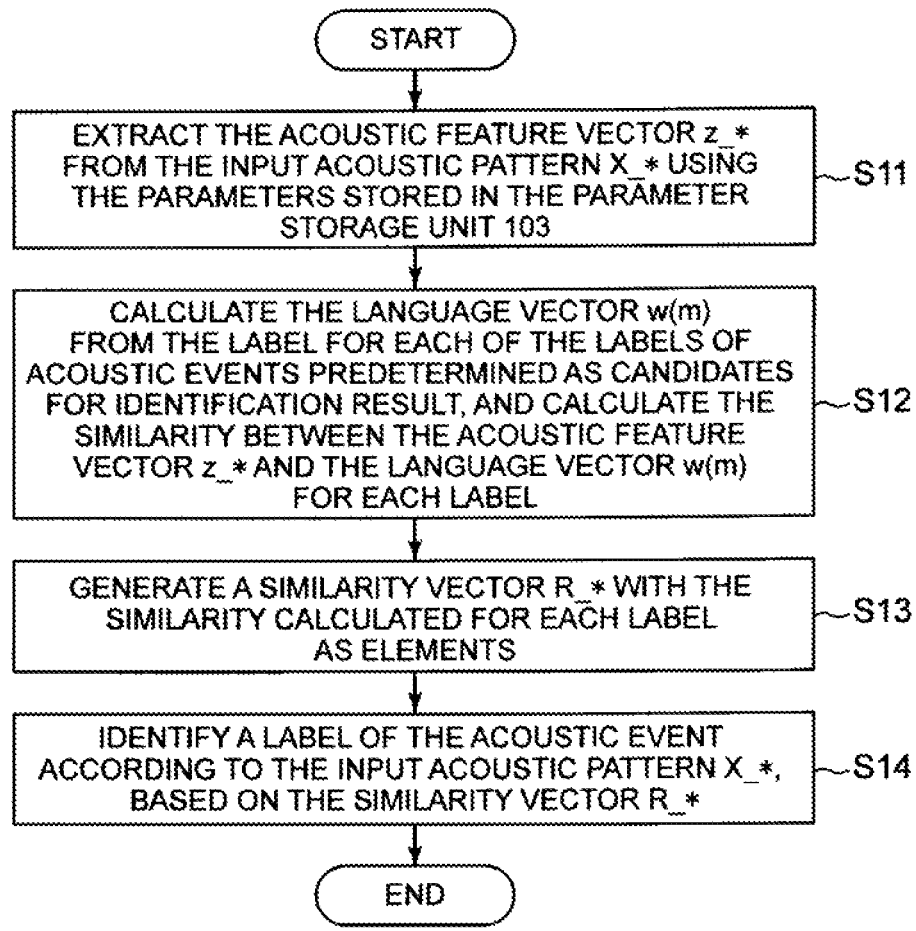
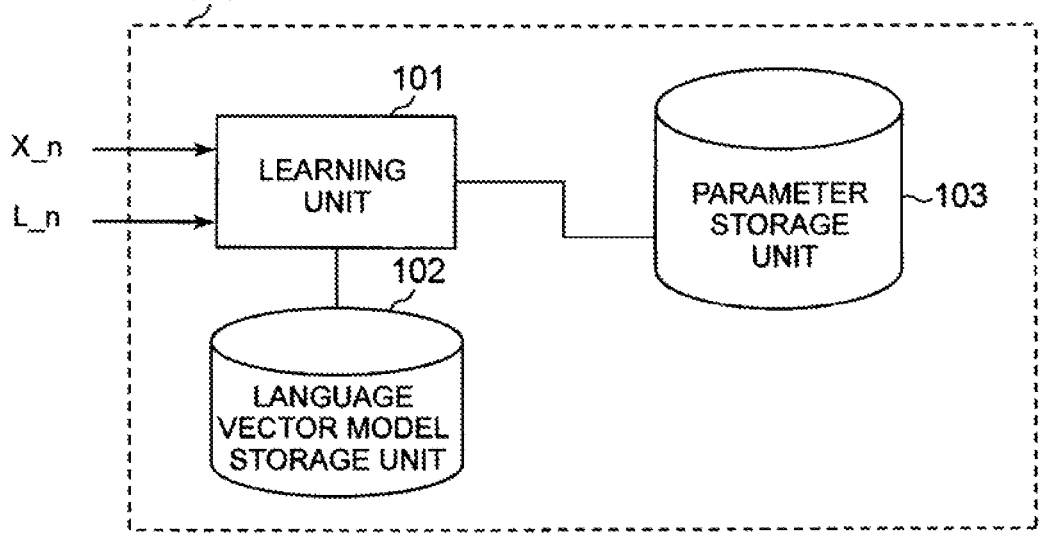

LEARNING DEVICE AND PATTERN RECOGNITION DEVICE

This application is a National Stage Entry of PCT/JP2018/034848 filed on Sep. 20, 2018, the contents of all of which are incorporated herein by reference, in their entirety.

TECHNICAL FIELD

The present invention relates to a learning device, a learning method and a learning program for learning parameters for extracting an acoustic feature from an acoustic pattern obtained as a result of processing on an acoustic signal, and a pattern recognition device, a pattern recognition method and a pattern recognition program for identifying a source of an acoustic signal that is the basis of a given acoustic pattern.

BACKGROUND ART

NPL 1 describes a device for classifying a received acoustic signal into predefined acoustic events and outputting a classification result, and a method for learning a discriminator for classifying an acoustic signal into acoustic events.

Here, an "acoustic signal" is a sound signal recorded by an instrument (e.g., a microphone, etc.).

Also, an "acoustic event" is an attribute of a source of an acoustic signal.

CITATION LIST

Non-Patent Literature

NPL 1: Rui Lu, Zhiyao Duan, "BIDIRECTIONAL GRU FOR SOUND EVENT DETECTION", [online], 2017, Detection and Classification of Acoustic Scenes and Event, [retrieved on Aug. 31, 2018], Internet, <URL: https://www.cs.tut.fi/sgn/arg/dcase2017/documents/challenge_technical_reports/DCASE2017_Lu_137.pdf>

SUMMARY OF INVENTION

Technical Problem

Even though the acoustic events are different, the generated sounds may be similar. In other words, even though the acoustic events are different, the similarity of the acoustic signals may be high. In such cases, there is a problem that the accuracy of identifying the acoustic event is reduced. For example, consider the classification of acoustic signals into one of two types of acoustic events, "scream" and "cheer", using the technique described in NPL 1. "Scream" and "cheer" are different acoustic events. However, the acoustic signal obtained from a scream and the acoustic signal obtained from a cheer are acoustic signals obtained from a loud human voice, and they are similar acoustic signals. Therefore, the acoustic feature extracted from the acoustic signal obtained from the scream and the acoustic feature extracted from the acoustic signal obtained from the cheer are also similar. As a result, in the technique described in NPL 1, the accuracy of the identification (classification) of acoustic event according to the acoustic signals obtained from screams and cheers is reduced.

Therefore, the present invention has an object to provide a learning device, a learning method, and a learning program for learning parameters that are used by a pattern recognition device that identifies an acoustic event from a given information when extracting an acoustic feature and that can improve the accuracy of identifying an acoustic event.

It is also an object of the present invention to provide a pattern recognition device, a pattern recognition method, and a pattern recognition program capable of identifying an acoustic event from a given information with high accuracy.

Solution to Problem

A learning device according to the present invention comprises: acoustic feature extraction means that extracts an acoustic feature, using predetermined parameters, from an acoustic pattern obtained as a result of processing on an acoustic signal; language vector calculation means that calculates a language vector from a given label that represents an attribute of a source of the acoustic signal and that is associated with the acoustic pattern; similarity calculation means that calculates a similarity between the acoustic feature and the language vector; and parameter update means that learns parameters so that the similarity becomes larger, and updates the predetermined parameters to the parameters obtained by learning.

The pattern recognition system according to the present invention comprises: acoustic feature extraction means that extracts an acoustic feature from an acoustic pattern using parameters for extracting the acoustic feature from the acoustic pattern, the parameters learned based on a pair of an acoustic pattern obtained as a result of processing on an acoustic signal and a label representing an attribute of a source of the acoustic signal; and identification means that identifies a label representing the attributes of the source of the acoustic signal on which the acoustic pattern is based, based on the acoustic feature.

A learning method according to the present invention, implemented by a computer, comprises: an acoustic feature extraction processing of extracting an acoustic feature, using predetermined parameters, from an acoustic pattern obtained as a result of processing on an acoustic signal; a language vector calculation processing of calculating a language vector from a given label that represents an attribute of a source of the acoustic signal and that is associated with the acoustic pattern; a similarity calculation processing of calculating a similarity between the acoustic feature and the language vector; and a parameter update processing of learning parameters so that the similarity becomes larger, and updating the predetermined parameters to the parameters obtained by learning.

A pattern recognition method according to the present invention, implemented by a computer, comprises: an acoustic feature extraction processing of extracting an acoustic feature from an acoustic pattern using parameters for extracting the acoustic feature from the acoustic pattern, the parameters learned based on a pair of an acoustic pattern obtained as a result of processing on an acoustic signal and a label representing an attribute of a source of the acoustic signal; and an identification processing of identifying a label representing the attributes of the source of the acoustic signal on which the acoustic pattern is based, based on the acoustic feature.

A learning program according to the present invention causes a computer to perform: an acoustic feature extraction processing of extracting an acoustic feature, using predetermined parameters, from an acoustic pattern obtained as a result of processing on an acoustic signal; a language vector calculation processing of calculating a language vector from a given label that represents an attribute of a source of the acoustic signal and that is associated with the acoustic pattern; a similarity calculation processing of calculating a similarity between the acoustic feature and the language vector; and a parameter update processing of learning parameters so that the similarity becomes larger, and updating the predetermined parameters to the parameters obtained by learning.

A pattern recognition program according to the present invention causes a computer to perform: an acoustic feature extraction processing of extracting an acoustic feature from an acoustic pattern using parameters for extracting the acoustic feature from the acoustic pattern, the parameters learned based on a pair of an acoustic pattern obtained as a result of processing on an acoustic signal and a label representing an attribute of a source of the acoustic signal; and an identification processing of identifying a label representing the attributes of the source of the acoustic signal on which the acoustic pattern is based, based on the acoustic feature.

Advantageous Effects of Invention

According to the present invention, parameters that are used by a pattern recognition device that identifies acoustic event from a given information when extracting acoustic feature and that can improve the identification accuracy of acoustic event, can be learned.

In addition, according to the present invention, an acoustic event can be identified with high accuracy from a given information.

BRIEF DESCRIPTION OF DRAWINGS

FIG. 4 It depicts a flowchart showing an example of the processing progress of identifying a label of an acoustic event according to an acoustic pattern X_*.

FIG. 5 It depicts a block diagram showing an example of the case where the learning device of the present invention is configured as a separate device from the pattern recognition device.

DESCRIPTION OF EMBODIMENTS

Hereinafter, exemplary embodiments of the present invention will be described with reference to the drawings.

Exemplary Embodiment 1

In the following description, a pattern recognition system including a learning device of the present invention (a learning device that learns parameters for extracting an acoustic feature from given information) and a pattern recognition device of the present invention (a pattern recognition device that identifies an acoustic event according to given information) will be described as an example. However, the learning device of the invention and the pattern recognition device of the invention may be independent devices. The "given information" above refers to the "acoustic pattern" described below. Pattern recognition means identifying an acoustic event according to an acoustic pattern, and the pattern recognition device may be referred to as an identification device. These points are the same in the second exemplary embodiment described below.

Figure 1:
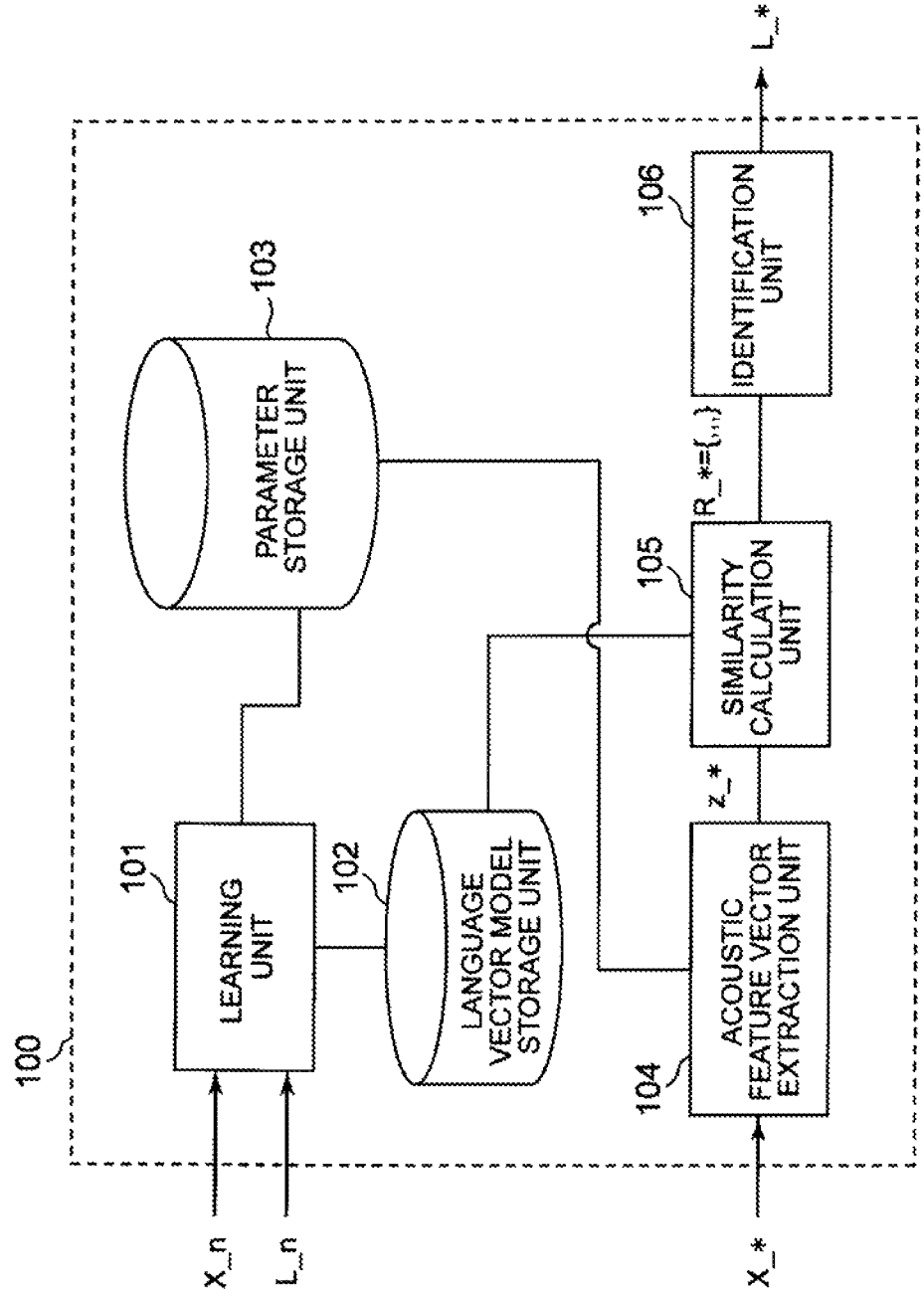
FIG. 1 It depicts a block diagram showing an example configuration of a pattern recognition system in the first exemplary embodiment.

FIG. 1 is a block diagram showing an example configuration of the pattern recognition system in the first exemplary embodiment. The pattern recognition system 100 in the first exemplary embodiment includes a learning unit 101, a language vector model storage unit 102, a parameter storage unit 103, an acoustic feature vector extraction unit 104, a similarity calculation unit 105, and an identification unit 106.

The part including the learning unit 101, the language vector model storage unit 102, and the parameter storage unit 103 corresponds to the learning device. The part including the language vector model storage unit 102, the parameter storage unit 103, the acoustic feature vector extraction unit 104, the similarity calculation unit 105, and the identification unit 106 corresponds to the pattern recognition device. The example shown in FIG. 1 shows a case in which the learning device and the pattern recognition device share the language vector model storage unit 102 and the parameter storage unit 103 in the pattern recognition system 100.

A pair of an acoustic pattern X_n and a label L_n corresponding to the acoustic pattern X_n is input to the learning unit 101. The acoustic pattern is described here. The "acoustic pattern" is the information obtained as a result of processing on the acoustic signal. For example, the digital signal sequence [x(1), . . . , x(T)] obtained by AD conversion (Analog to Digital Conversion) of an analog acoustic signal recorded by an acoustic sensor such as a microphone or a two-dimensional array obtained as a result of frequency analysis, by short-time Fourier transform or Constant-Q transform and the like, of the digital signal sequence [x(1), . . . , x(T)] can be used as the acoustic pattern. Here, T is a predetermined time width (e.g., 1-10 seconds), and the value corresponding to the time width of the acoustic event to be detected may be set as T. The acoustic pattern may be a vector (one-dimensional array) or an array of two or more dimensions. The acoustic pattern can be said to be the result of processing the acoustic signal so that the acoustic signal becomes a finite vector or an array of two or more dimensions.

The label $L\_n$ corresponding to the acoustic pattern $X\_n$ is a label that represents an acoustic event of the acoustic signal on which the acoustic pattern $X\_n$ is based and that is represented by a character string. The acoustic event is an attribute of the source of the acoustic signal, as already described.

It is assumed that the pair of the acoustic pattern $X\_n$ and the label $L\_n$ {$X\_n$, $L\_n$} has been derived beforehand based on an acoustic signal where the acoustic event is known.

The pair of the acoustic pattern $X\_n$ and the label $L\_n$ {$X\_n$, $L\_n$} is input to the learning unit 101, and the learning unit 101 learns the parameters $\Theta$ to extract an acoustic feature vector from the acoustic pattern. Here, "n" is the index number of the learning dataset (the pair of the acoustic pattern and the label). If the number of input learning datasets is N, then n is an integer from 1 to N.

The parameter storage unit 103 is a storage device that stores parameters $\Theta$ for extracting an acoustic feature vector from an acoustic pattern. Initially, the parameter storage 103 stores predetermined initial values of the parameters $\Theta$.

The learning unit 101 learns the parameters $\Theta$ using the pair {$X\_n$, $L\_n$} of the input acoustic pattern $X\_n$ and the label $L\_n$, and updates the parameters stored in the parameter storage unit 103 to the parameters $\Theta$ obtained by learning.

Figure 2:
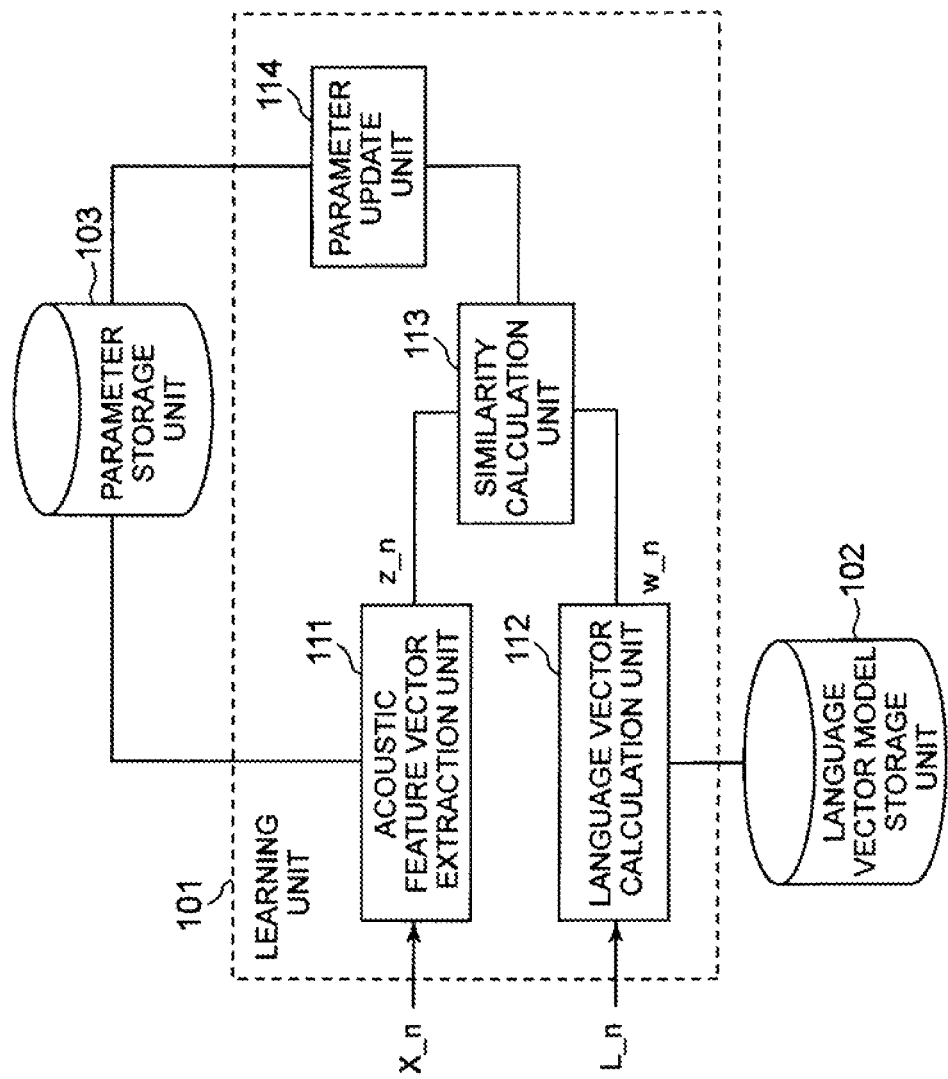
FIG. 2 It depicts a block diagram showing an example configuration of a learning unit.

FIG. 2 is a block diagram showing an example configuration of the learning unit 101. In FIG. 2, the language vector model storage unit 102 and the parameter storage unit 103 are also illustrated with the learning unit 101. The learning unit 101 includes an acoustic feature vector extraction unit 111, a language vector calculation unit 112, a similarity calculation unit 113, and a parameter update unit 114.

Since the acoustic feature vector extraction unit 111 in the learning unit 101 is included in the part corresponding to the learning device, it is distinguished from the acoustic feature vector extraction unit 104 (see FIG. 1), which is included in the part corresponding to the pattern recognition device, and the acoustic feature vector extraction unit 111 is represented with the sign "111" as shown in FIG. 2. Similarly, since the similarity calculation unit 113 in the learning unit 101 is included in the part corresponding to the learning device, it is distinguished from the similarity calculation unit 105 (see FIG. 1), which is included in the part corresponding to the pattern recognition device, and the similarity calculation unit 113 is represented with the sign "113" as shown in FIG. 2.

The acoustic feature vector extraction unit 111 takes the acoustic pattern $X\_n$ as an input and extracts the acoustic feature vector $z\_n$ from the acoustic pattern $X\_n$ using the parameters $\Theta$ stored in the parameter storage unit 103, and outputs the acoustic feature vector $z\_n$. The parameters $\Theta$ for extracting the acoustic feature vector from the acoustic pattern is, for example, parameters of the neural network, but parameters $\Theta$ can be any other parameters. The acoustic feature vector extraction unit 111 may be configured to extract the acoustic feature vector from an acoustic pattern represented by a vector or an array of two or more dimensions, using the parameters $\Theta$. The method of extracting the acoustic feature vector may be the method described in the NPL 1, or any other method.

The language vector model storage unit 102 is a storage device that stores a model for calculating a vector from a label represented by a character string (hereinafter referred to as a language vector model). The vector calculated from the label based on the language vector model is referred to as a language vector.

The language vector calculation unit 112 calculates a language vector $w\_n$ based on the language vector model from the label $L\_n$, which represents the acoustic event of the acoustic signal on which the acoustic pattern $X\_n$ is based, and outputs the language vector $w\_n$.

Here, the language vector calculation unit 112 calculates the language vectors from the labels so that the closer the meaning of the two labels is, the smaller the distance of the language vectors obtained from each of the two labels, and the farther the meaning of the two labels is, the larger the distance of the language vectors obtained from each of the two labels. As such techniques for calculating language vectors, for example, "word2vec", "skip gram", "GloVe" and the like may be used.

For example, the meanings of the label "scream" and the label "shriek" are close. Therefore, the distance between the language vector calculated by the language vector calculation unit 112 from the label "scream" and the language vector calculated by the language vector calculation unit 112 from the label "shriek" is small. Also, for example, the meaning of the label "scream" and the label "cheer" are far apart. Therefore, the distance between the language vector calculated by the language vector calculation unit 112 from the label "scream" and the language vector calculated by the language vector calculation unit 112 from the label "cheer" is large.

Here, the number of dimensions of the acoustic feature vector $z\_n$ extracted by the acoustic feature vector extraction unit 111 and the number of dimensions of the language vector $w\_n$ calculated by the language vector calculation unit 112 must be equal. That is, the acoustic feature vector $z\_n$ is a vector with the number of dimensions equal to the number of dimensions of the language vector $w\_n$.

The similarity calculation unit 113 calculates the similarity $d(z\_n, w\_n)$ between the acoustic feature vector $z\_n$ and the language vector $w\_n$ and outputs the similarity. $d(,)$ is a similarity function for finding the similarity. For example, any error function such as cosine similarity, Mean Squared Error (MSE) or Mean Absolute Error (MAE) is used as the similarity function.

The parameter update unit 114 uses the error function to learn the parameters $\Theta$ for extracting the acoustic feature vector from the acoustic pattern.

The initial values of the parameters $\Theta$ that are stored by the parameter storage unit 103 in the initial state are parameters that have been learned beforehand from random numbers or other data, for example.

The parameter update unit 114 learns the parameters $\Theta$ by a neural network learning method such as stochastic gradient descent based on the above error function. The parameter update unit 114 learns parameters $\Theta$ for extracting the acoustic feature vector from the acoustic pattern so that the similarity $d(z\_n, w\_n)$ between the acoustic feature vector $z\_n$ extracted from the acoustic pattern $X\_n$ and the language vector $w\_n$ calculated from the label paired with the acoustic pattern $X\_n$ becomes larger.

When the parameters $\Theta$ are learned, the parameter update unit 114 updates the parameters stored in the parameter storage unit 103 to the newly learned parameters $\Theta$.

When the parameters stored in the parameter storage unit 103 are updated, the acoustic feature vector extraction unit 111 extracts the acoustic feature vector $z\_n$ again using the updated parameters. The parameters $\Theta$ is learned so that the similarity $d(z\_n, w\_n)$ becomes larger. The acoustic feature vector extracted using these parameters is extracted as a vector in the same space as the vector from which the semantic distance of the label can be calculated. The acoustic feature vector is then a vector that reflects the semantic distance to the label used during learning.

The processing of extracting the acoustic feature vector $z\_n$ using the parameters stored in the parameter storage unit 103 by the acoustic feature vector extraction unit 111, the processing of calculating the similarity $d(z\_n, w\_n)$ by the similarity calculation unit 113, and the processing of learning the parameters $\Theta$ and updating the parameters stored in the parameter storage unit 103 to the newly learned parameters $\Theta$ by the parameter update unit 114 are repeated until a predetermined convergence condition is satisfied. As the convergence condition, for example, a condition that the number of iterations of the above processing reaches a predetermined number, a condition that the similarity $d(z\_n, w\_n)$ reaches or exceeds a predetermined value, etc. can be used.

Next, the acoustic feature vector extraction unit 104, the similarity calculation unit 105, and the identification unit 106 shown in FIG. 1 will be described. It is assumed that the parameter storage unit 103 stores the parameters $\Theta$, which is learned by the learning unit 101.

An acoustic pattern $X\_*$ whose label of the corresponding acoustic event is unknown is input to the acoustic feature vector extraction unit 104. The acoustic pattern $X\_*$ input to the acoustic feature vector extraction unit 104 is assumed to have been derived beforehand based on an acoustic signal whose acoustic event is unknown. An example of a method of finding the acoustic pattern based on an acoustic signal has already been described and will not be described here.

The acoustic feature vector extraction unit 104 extracts the acoustic feature vector $z\_*$ from the acoustic pattern $X\_*$ using the parameters $\Theta$ stored in the parameter storage unit 103. The operation of the acoustic feature vector extraction unit 104 to extract the acoustic feature vector from the acoustic pattern using the parameters $\Theta$ is similar to the operation of the acoustic feature vector extraction unit 111 (see FIG. 2) to extract the acoustic feature vector from the acoustic pattern using the parameters $\Theta$.

The similarity calculation unit 105 holds in advance a plurality of labels of predetermined acoustic events defined as candidates for identification result. For each of the labels, the similarity calculation unit 105 calculates a language vector from the label based on the language vector model stored in the language vector model storage unit 102. The similarity calculation unit 105 further calculates, for each of its labels, the similarity between the calculated language vector and the acoustic feature vector $z\_*$ extracted by the acoustic feature vector extraction unit 104. The operation of the similarity calculation unit 105 to calculate the similarity between the language vector and the acoustic feature vector is similar to the operation of the similarity calculation unit 113 (see FIG. 2) to calculate the similarity between the language vector and the acoustic feature vector. The index number of the label of the predetermined acoustic event as a candidate for the identification result is represented by m. Let M be the total number of labels of acoustic events predetermined as candidate identification result, and m is an integer from 1 to M. The language vector calculated from the m-th label by the similarity calculation unit 105 is denoted by $w(m)$.

The number of dimensions of the acoustic feature vector $z\_*$ extracted by the acoustic feature vector extraction unit 104 and the number of dimensions of each language vector calculated by the similarity calculation unit 105 for each label must be equal. That is, the acoustic feature vector $z\_*$ is a vector with the number of dimensions equal to each language vector calculated by the similarity calculation unit 105 for each label.

The similarity calculation unit 105 generates a vector $R\_*$ (hereafter referred to as the similarity vector $R\_*$) with the similarity $d(z\_*, w(m))$ calculated for each label as elements.

For example, suppose that there are three predetermined acoustic event labels as candidate identification result: "music", "voice", and "gunshot". In this case, $w(1)$, $w(2)$, and $w(3)$ are language vectors calculated from "music," "voice," and "gunshot," respectively. The similarity vector $R\_*$ is then expressed as a vector with three elements $[d(z\_*, w(1)), d(z\_*, w(2)), d(z\_*, w(3))]$.

The similarity calculation unit 105 sends a similarity vector $R\_*$ to the identification unit 106.

The identification unit 106 identifies a label of an acoustic event according to the acoustic pattern $X\_*$, based on the similarity vector $R\_*$. The identification unit 106 may, for example, determine the label corresponding to the largest element among the elements of the similarity vector $R\_*$ among the labels of acoustic events predetermined as candidates for identification result as the label $L\_*$ of the acoustic events according to the acoustic pattern $X\_*$.

Also, instead of determining a single label $L\_*$ as the identification result, the identification unit 106 may sort the individual labels corresponding to the individual elements of the similarity vector $R\_*$ in descending order of the values of the elements of the similarity vector $R\_*$, and output each label, sorted in descending order of the values of the elements of the similarity vector $R\_*$, as the identification result.

The identification unit 106 may also identify the label $L\_*$ of the acoustic event according to the acoustic pattern $X\_*$ by applying the similarity vector $R\_*$ to the discriminator, such as a support vector machine or a neural network. In this case, the discriminator may be pre-learned by machine learning beforehand, using a pair of an acoustic pattern $X\_n$ and a label $L\_n$, etc.

For example, the learning unit 101 including the acoustic feature vector extraction unit 111, the language vector calculation unit 112, the similarity calculation unit 113, and the parameter update unit 114, is realized by a CPU (Central Processing Unit) of a computer that operates according to a learning program. In this case, for example, the CPU may read the learning program from a program recording medium such as a program storage device of the computer, and operate as the learning unit 101 including the acoustic feature vector extraction unit 111, the language vector calculation unit 112, the similarity calculation unit 113, and the parameter update unit 114 according to the learning program.

For example, the acoustic feature vector extraction unit 104, the similarity calculation unit 105, and the identification unit 106 are realized by a CPU of a computer that operates according to a pattern recognition program. In this case, for example, the CPU may read the pattern recognition program from a program recording medium such as a program storage device of the computer, and operate as the acoustic feature vector extraction unit 104, the similarity calculation unit 105, and the identification unit 106 according to the pattern recognition program.

The parameter storage unit 103 and the language vector model storage unit 102 are realized, for example, by a storage device included in the computer.

Figure 3:
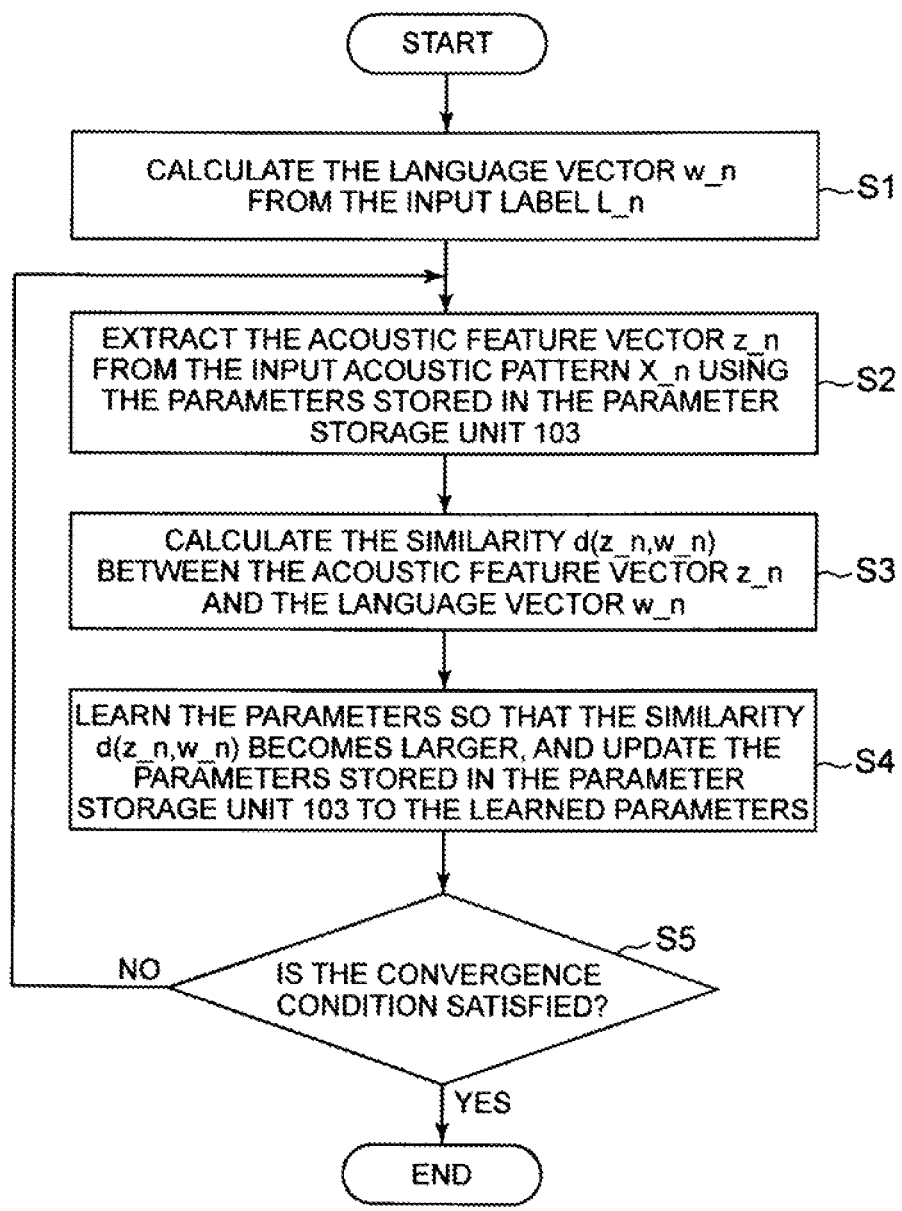
FIG. 3 It depicts a flowchart showing an example of the processing progress when the learning unit learns parameters.

Next, the processing progress of the first exemplary embodiment will be described. FIG. 3 is a flowchart showing an example of the processing progress when the learning unit 101 learns the parameters Θ. The matters already described will not be described in detail. It is assumed that the parameter storage unit 103 stores the initial values of the parameters Θ, which are predetermined.

First, a pair of an acoustic pattern X_n and a label L_n corresponding to the acoustic pattern X_n is input to the learning unit 101.

Then, the language vector calculation unit 112 calculates the language vector w_n from the label L_n based on the language vector model (step S1).

The acoustic feature vector extraction unit 111 extracts the acoustic feature vector z_n from the input acoustic pattern X_n using the parameters Θ stored in the parameter storage unit 103 (step S2).

Next, the similarity calculation unit 113 calculates the similarity d(z_n, w_n) between the acoustic feature vector z_n extracted in step S2 and the language vector w_n calculated in step S1 (step S3).

The parameter update unit 114 learns the parameters Θ so that the similarity d(z_n, w_n) that is calculated by the similarity calculation unit 113 becomes larger, and updates the parameters Θ stored in the parameter storage unit 103 to the learned parameters Θ (step S4).

The parameter update unit 114 then determines whether the convergence condition is satisfied or not (Step S5). If the convergence condition is not satisfied (No in step S5), the learning unit 101 repeats the process of steps S2 to S5. If the convergence condition is satisfied (Yes in step S5), the learning unit 101 ends the learning of the parameters Θ. As examples of convergence conditions, a condition that the number of iterations of steps S2-S5 reaches a predetermined number, a condition that the similarity d(z_n, w_n) calculated in step S3 reaches or exceeds a predetermined value, etc. can be used.

FIG. 4 is a flowchart showing an example of the processing progress of identifying the label of an acoustic event according to the acoustic pattern X_* when the acoustic pattern X_* whose label of the corresponding acoustic event is unknown is input. The matters already explained will not be explained in detail. It is assumed that the parameter storage unit 103 stores the parameters Θ that are updated by the learning unit 101.

First, the acoustic pattern X_* whose label of the corresponding acoustic event is unknown is input to the acoustic feature vector extraction unit 104.

Then, the acoustic feature vector extraction unit 104 extracts the acoustic feature vector z_* from the input acoustic pattern X_* using the parameters Θ stored in the parameter storage unit 103 (step S11).

Next, the similarity calculation unit 105 calculates the language vector w(m) from the label for each of the labels of acoustic events predetermined as candidates for identification result. Then, the similarity calculation unit 105 calculates the similarity between the acoustic feature vector z_* and the language vector w(m) for each label (step S12).

The similarity calculation unit 105 generates a similarity vector R_* with the similarity calculated for each label in step S12 as elements (step S13).

Based on the similarity vector R_*, the identification unit 106 identifies a label of the acoustic event according to the input acoustic pattern X_* (step S14).

According to the present exemplary embodiment, the parameter update unit 114 learns the parameters Θ so that the similarity d(z_n, w_n) between the acoustic feature vector z_n and the language vector w_n becomes larger, and updates the parameters stored in the parameter storage unit 103 to the learned parameters Θ. The acoustic feature vectors extracted from the acoustic pattern using the parameters is a vector that reflects the semantic distance from the label. The acoustic feature vector extraction unit 104 (see FIG. 1) in the present exemplary embodiment is able to extract such an acoustic feature vector. For example, it is assumed that there are two similar acoustic patterns and the acoustic event (referred as A) corresponding to one acoustic pattern and the acoustic event corresponding to the other acoustic pattern are not similar. In this case, the acoustic feature vector extracted from the one acoustic pattern is a vector with a small semantic distance from the label of the acoustic event A. The acoustic event vector extracted from the other acoustic pattern is a vector with a large semantic distance from the label of the acoustic event A. Thus, even if the acoustic patterns are similar, different acoustic feature vectors are extracted depending on the label that is the correct answer. Thus, the identification accuracy in identifying the label of the acoustic event from the input acoustic pattern X_* can be high.

Thus, in the present exemplary embodiment, parameters Θ can be learned, which can improve the identification accuracy in identifying an acoustic event from a given acoustic pattern. The acoustic events can then be identified from a given acoustic pattern with high accuracy.

Next, modification examples of the first exemplary embodiment are described.

In the first exemplary embodiment above, the configuration that the part corresponding to the pattern recognition device within the pattern recognition system 100 (see FIG. 1) includes the similarity calculation unit 105 (see FIG. 1) is shown. The configuration of the pattern recognition system 100 need not include the similarity calculation unit 105. In this case, the similarity vector R_* need not be generated because the similarity calculation unit 105 is not provided.

In this case, the identification unit 106 may identify the label L_* of the acoustic event according to the acoustic pattern X_* by applying the acoustic feature vector z_* extracted from the acoustic pattern X_* by the acoustic feature vector extraction unit 104 to the discriminator. The discriminator can be learned by machine learning beforehand using a pair of an acoustic pattern X_n and a label L_n, etc. The other points are similar to the first exemplary embodiment.

In this case, the same effect as above is achieved because the acoustic feature vector z_* is a vector that reflects the semantic distance from the label.

The first exemplary embodiment also showed a pattern recognition system 100 (see FIG. 1) that includes the learning device of the present invention and the pattern recognition device of the present invention. The learning device of the present invention and the pattern recognition device of the present invention may be independent devices.

FIG. 5 is a block diagram showing an example of the case where the learning device of the present invention is configured as a separate device from the pattern recognition device. Elements similar to those shown in FIG. 1 are marked with the same sign as in FIG. 1 and the description will be omitted. The learning device 150 includes a learning unit 101, a language vector model storage unit 102, and a parameter storage unit 103. The learning unit 101 includes an acoustic feature vector extraction unit 111, a language vector calculation unit 112, a similarity calculation unit 113, and a parameter update unit 114, as shown in FIG. 2. Each of these elements is the same as each of the elements described in the first exemplary embodiment above and the description will be omitted. The learning device 150 shown in FIG. 5 can also learn a parameters Θ that can improve the identification accuracy in identifying an acoustic event from a given acoustic pattern.

Figure 6:
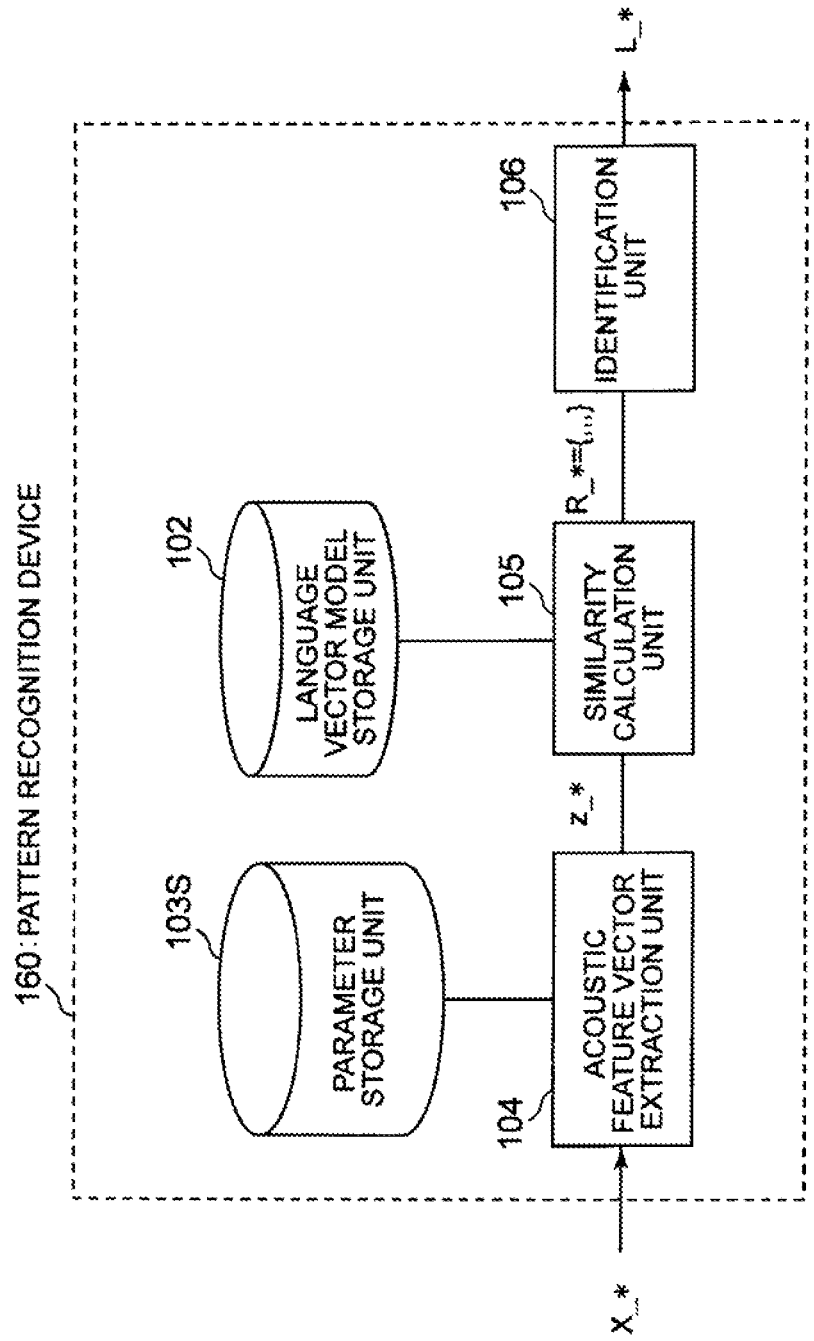
FIG. 6 It depicts a block diagram showing an example of the case where the pattern recognition device of the present invention is configured as a separate device from the learning device.

FIG. 6 is a block diagram showing an example of the case where the pattern recognition device of the present invention is configured as a separate device from the learning device. Elements similar to those shown in FIG. 1 are marked with the same sign as in FIG. 1 and the description will be omitted. The pattern recognition device 160 includes an acoustic feature vector extraction unit 104, a similarity calculation unit 105, an identification unit 106, a parameter storage unit 103S, and a language vector model storage unit 102. The parameter storage unit 103S is a storage unit that stores the parameters Θ learned by the learning device. For example, the parameters learned by the learning device 150 shown in FIG. 5 and stored in the parameter storage unit 103 shown in FIG. 5 may be copied to the parameter storage unit 103S of the pattern recognition device 160. The pattern recognition device 160 shown in FIG. 6 can also identify an acoustic event from a given acoustic pattern with high accuracy.

Exemplary Embodiment 2

In the second exemplary embodiment, the labels given for parameter learning are labels defined for each hierarchy of acoustic event categories. In the second exemplary embodiment, the labels defined for each hierarchy of acoustic event categories will first be described with specific examples.

Consider (A) "male scream", (B) "male cheer", (C) "female scream", and (D) "guitar rock music" as acoustic events. In this case, (A), (B), and (C) all fall under the category of "human voice" in a broad sense. Also, (D) falls under the category of "music" in the broad sense. Also, (A) and (B) fall under the category of "male voice", which is a subcategory of "human voice", and (C) falls under the category of "female voice", which is a subcategory of "human voice". (A) falls under the category of "male scream", which is a subcategory of "male voice", and (D) falls under the category of "rock music", which is a subcategory of "music", and also falls under the category of "guitar rock music", which is a subcategory of "rock music".

As we can see from the above example, categories can be hierarchized by breadth of meaning. The broader the meaning of a category, the higher the hierarchy of the category, and the narrower the meaning of a category, the lower the hierarchy of the category. And for each hierarchy of categories, a character string to be a label can be defined. Thus, the labels defined for each hierarchy of categories of an acoustic event can be used as labels for learning. For example, the label L of (A) above can be represented as L={human voice, male voice, male scream}. The label L of (B) above can be represented as L={human voice, male voice, male cheer}. The label L of (C) above can be represented as L={human voice, female voice, female scream}. The label L of (D) above can be represented as L={music, rock music, guitar rock music}. In the second exemplary embodiment, labels with such a hierarchical structure are used for learning. The labels obtained as a result of identification also have the hierarchical structure. Here, the number of hierarchies is set to "3", but the number of hierarchies may be defined at any granularity. And for the labels used for learning, each hierarchy may have a character string corresponding to the hierarchy. The number of category hierarchies is defined equally for all labels.

In the following description, the case where the labels are represented by three hierarchies is described. That is, the description is based on the example of a case where the number of hierarchies of categories in each label is 3. However, the number of hierarchies is not limited to 3.

Figure 7:
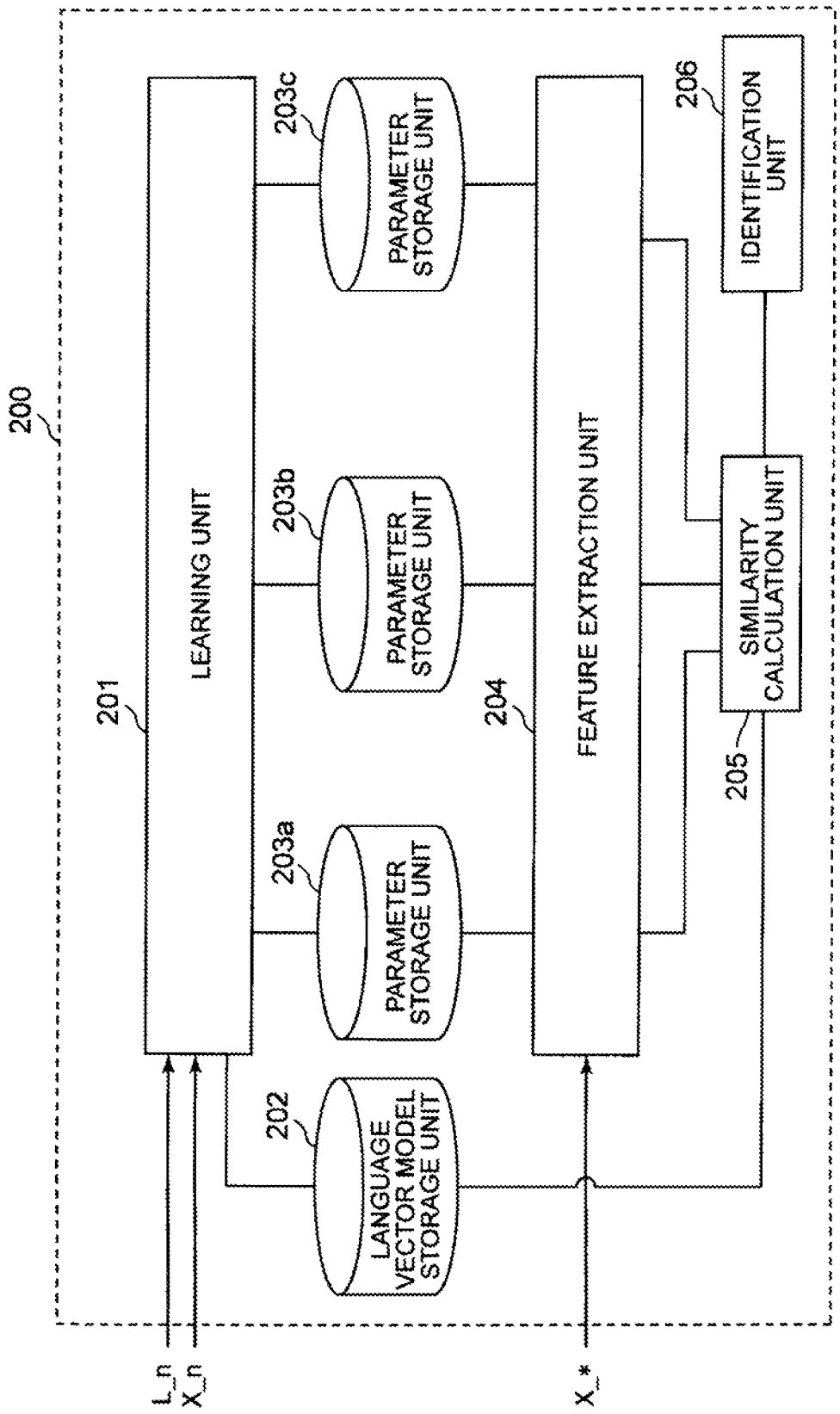
FIG. 7 It depicts a block diagram showing an example configuration of a pattern recognition system in the second exemplary embodiment.

FIG. 7 is a block diagram showing an example configuration of a pattern recognition system in the second exemplary embodiment. The pattern recognition system 200 in the second exemplary embodiment includes a learning unit 201, a language vector model storage unit 202, parameter storage units 203a, 203b, 203c, a feature extraction unit 204, a similarity calculation unit 205, and an identification unit 206.

The part including the learning unit 201, the language vector model storage unit 202, and the parameter storage units 203a, 203b, 203c corresponds to the learning device. The part including the language vector model storage unit 202, the parameter storage units 203a, 203b, 203c, the feature extraction unit 204, the similarity calculation unit 205, and the identification unit 206 corresponds to the pattern recognition device. The example shown in FIG. 7 shows a case in which the learning device and the pattern recognition device share the language vector model storage unit 202 and the parameter storage units 203a, 203b, 203c in the pattern recognition system 200.

A pair of an acoustic pattern X_n and a label L_n corresponding to the acoustic pattern X_n is input to the learning unit 201. The label L_n is a label with a hierarchical structure, represented as L_n={L_n1, L_n2, L_n3}, where L_n1 is the label of the highest hierarchy, L_n2 is the label of the second hierarchy, and L_n3 is the label of the third hierarchy. The higher the hierarchy, the broader the meaning of the label, and the lower the hierarchy, the narrower the meaning of the label. It is assumed that the pair of an acoustic pattern X_n and a label L_n {X_n, L_n} has been derived beforehand based on an acoustic signal where the acoustic event is known. An example of a method of finding the acoustic pattern based on the acoustic signal has already been described in the first exemplary embodiment, and the description will be omitted here.

The learning unit 201 learns the parameters for each category hierarchy. Details of the learning unit 201 are described later.

The parameter storage unit 203a is a storage device storing parameters corresponding to the highest hierarchy. The parameter storage unit 203b is a storage device storing parameters corresponding to the second hierarchy. The parameter storage unit 203c is a storage device storing parameters corresponding to the third hierarchy. Thus, in the second exemplary embodiment, the parameter storage units 203a, 203b, and 203c are provided for each hierarchy of categories.

The language vector model storage unit 202 is a storage unit for storing a language vector model. The language vector model storage unit 202 is similar to the language vector model storage unit 102 in the first exemplary embodiment.

An acoustic pattern X_* whose label of the corresponding acoustic event is unknown is input to the feature extraction unit 204. The feature extraction unit 204 then extracts the acoustic feature vectors z_*1, z_*2, and z_*3 for each hierarchy. Details of the feature extraction unit 204 are described later.

The similarity calculation unit 205 generates a similarity vector for each hierarchy based on the acoustic feature vectors z_*1, z_*2, and z_*3 extracted for each hierarchy.

Specifically, the similarity calculation unit 205 holds in advance, for each hierarchy, a plurality of labels of predetermined acoustic events defined as candidates for identification result. Then, the similarity calculation unit 205 calculates a language vector from the label based on the language vector model stored in the language vector model storage unit 202, for each held label, for each hierarchy.

Furthermore, the similarity calculation unit 205 calculates the similarity between each language vector calculated for each label and the acoustic feature vector, for each hierarchy. Then, the similarity calculation unit 205 generates the similarity vector for each hierarchy with the calculated similarity as elements. For example, the similarity calculation unit 205 calculates the similarity between each language vector calculated from each label that was predetermined for the highest hierarchy and the acoustic feature vector z_*1 corresponding to the highest hierarchy, respectively, and generates the similarity vector with the similarity as elements. The similarity calculation unit 205 generates the similarity vector for each of the other hierarchies as well.

The identification unit 206 identifies a label for each hierarchy based on each similarity vector generated for each the hierarchy. In an individual hierarchy, the method of identifying a label based on the similarity vector may be the same as the method described in the first exemplary embodiment.

For example, the identification unit 206 may perform the processing of identifying the label corresponding to the largest element of the similarity vector, for each hierarchy.

For example, the identification unit 206 may perform the processing of sorting the individual labels corresponding to the individual elements of the similarity vector in descending order of the values of the elements of the similarity vector, and defining each label sorted in descending order of the values of the elements of the similarity vector as an identification result, for each hierarchy.

For example, the identification unit 206 may perform the processing of identifying a label by applying the similarity vector to the discriminator, for each hierarchy. In this case, the discriminator may be learned beforehand for each hierarchy.

Figure 8:
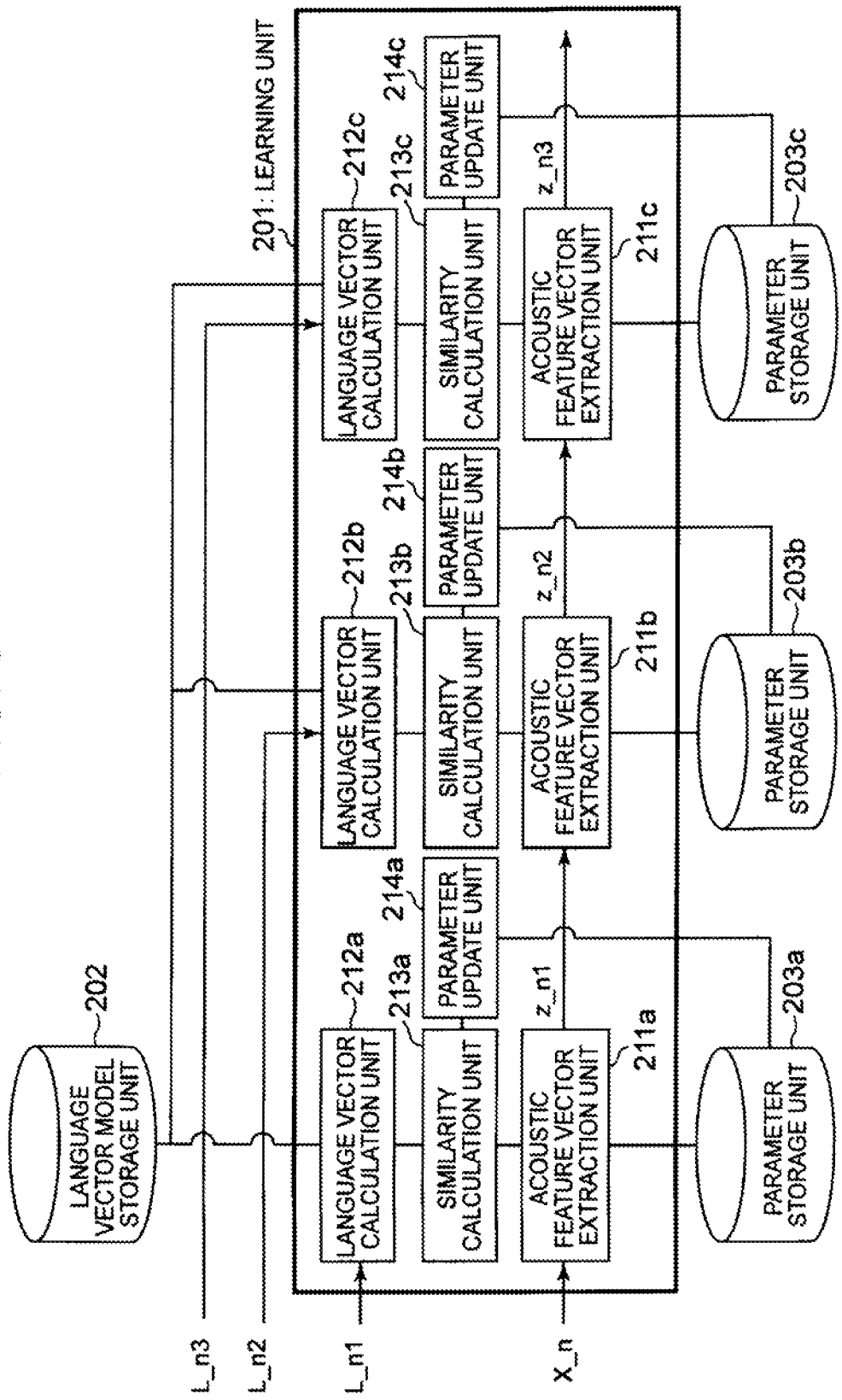
FIG. 8 It depicts a block diagram showing an example configuration of a learning unit in the second exemplary embodiment.

FIG. 8 is a block diagram showing an example configuration of the learning unit 201 in the second exemplary embodiment. In FIG. 8, the language vector model storage unit 202 and the parameter storage units 203a, 203b, 203c are also illustrated with the learning unit 201.

The learning unit 201 includes, for each hierarchy, an acoustic feature vector extraction unit 211, a language vector calculation unit 212, a similarity calculation unit 213, and a parameter update unit 214. In the following, each element corresponding to the highest hierarchy (the acoustic feature vector extraction unit 211, the language vector calculation unit 212, the similarity calculation unit 213, and the parameter update unit 214) will be represented with a subscript "a" in each sign. Similarly, each element corresponding to the second hierarchy is represented with a subscript "b" for each sign, and each element corresponding to the third hierarchy is represented with a subscript "c" for each sign.

The acoustic feature vector extraction unit 211 of each hierarchy extracts the acoustic feature vector in its own hierarchy from the given acoustic pattern X_n or the acoustic feature vector extracted by the acoustic feature vector extraction unit of one higher hierarchy.

Specifically, the acoustic feature vector extraction unit 211a of the highest hierarchy extracts the acoustic feature vector z_n1 from the given acoustic pattern X_n using parameters of the highest hierarchy (parameters stored in the parameter storage unit 203a). The acoustic feature vector z_n1 is the acoustic feature vector of the highest hierarchy. The acoustic feature vector extraction unit 211a sends the acoustic feature vector z_n1 to the similarity calculation unit 213a in the hierarchy of the acoustic feature vector extraction unit 211a (the highest hierarchy), and also to the acoustic feature vector extraction unit 211b of one lower hierarchy.

The acoustic feature vector extraction unit 211 of each hierarchy other than the highest hierarchy (the acoustic feature vector extraction unit 211b is used as an example here) using parameters of the hierarchy of the acoustic feature vector extraction unit 211b (parameters stored in parameter storage unit 203b), extracts the acoustic feature vector z_n2 of the hierarchy of the acoustic feature vector extraction unit 211b from the acoustic feature vector z_n1 extracted by the acoustic feature vector extraction unit 211a of one higher hierarchy than the acoustic feature vector extraction unit 211b. The acoustic feature vector extraction unit 211b sends the acoustic feature vector z_n2 to the similarity calculation unit 213b in the hierarchy of the acoustic feature vector extraction unit 211b, and to the acoustic feature vector extraction unit 211c of one lower hierarchy.

Here, the acoustic feature vector extraction unit 211b is described as an example of the acoustic feature vector extraction unit 211 other than the highest hierarchy, and the operation of the acoustic feature vector extraction unit 211c is similar. However, if the acoustic feature vector extraction unit 211 of one lower hierarchy does not exist, it is not necessary to send the acoustic feature vector to the acoustic feature vector extraction unit 211 of one lower hierarchy.

The acoustic feature vector extraction units 211a, 211b, 211c at each hierarchy are all configured to extract an acoustic feature vector from a vector or information represented as an array of two or more dimensions.

The language vector calculation unit 212 of each hierarchy calculates a language vector from the label corresponding to the hierarchy of the language vector calculation unit 212 itself among the labels L_n1, L_n2, and L_n3 in a given L_n, based on the language vector model stored in the language vector model storage unit 202. The language vector calculation unit 212 then sends the language vector to the similarity calculation unit 213 in the hierarchy of the language vector calculation unit 212.

For example, the language vector calculation unit 212a of the highest hierarchy calculates the language vector from L_n1 at L_n={L_n1, L_n2, L_n3} based on the language vector model, and sends the language vector to the similarity calculation unit 213a.

The operation of the language vector calculation units 212b, 212c of the other hierarchies is similar. The operation of the language vector calculation unit 212 of each hierarchy to calculate a language vector from a label based on the language vector model is the same as the operation of the language vector calculation unit 112 to calculate a language vector in the first exemplary embodiment.

The similarity calculation unit 213 of each hierarchy calculates the similarity between the acoustic feature vector and the language vector sent from the acoustic feature vector extraction unit 211 and the language vector calculation unit 212 of the hierarchy of the similarity calculation unit 213.

For example, the similarity calculation unit 213a of the highest hierarchy calculates the similarity between the acoustic feature vector z_n1 sent by the acoustic feature vector extraction unit 211a and the language vector sent by the language vector calculation unit 212a.

The operation of the similarity calculation units 213b, 213c of the other hierarchies is similar. The operation of the similarity calculation unit 213 of each hierarchy to calculate the similarity between an acoustic feature vector and a language vector is similar to the operation of the similarity calculation unit 113 to calculate the similarity between an acoustic feature vector and a language vector in the first exemplary embodiment.

The parameter update unit 214 of each hierarchy learns the parameters (parameters for extracting acoustic feature vectors) of the hierarchy of the parameter update unit 214 itself so that the similarity (similarity between the acoustic feature vector and a language vector) calculated by the similarity calculation unit 213 of the hierarchy becomes larger. Then, the parameter update unit 214 updates the parameters stored in the parameter storage unit 203 of the hierarchy to the learned parameters.

For example, the parameter update unit 214a of the highest hierarchy learns the parameters of the highest hierarchy so that the similarity calculated by the similarity calculation unit 213a becomes larger, and updates the parameters stored in the parameter storage unit 203a to the learned parameters.

The operation of the parameter update unit 214b, 214b of other hierarchies is similar. In addition, the operation of the parameter update unit 214 of each hierarchy to learn the parameters is similar to the operation of the parameter update unit 214 in the first exemplary embodiment.

Figure 9:
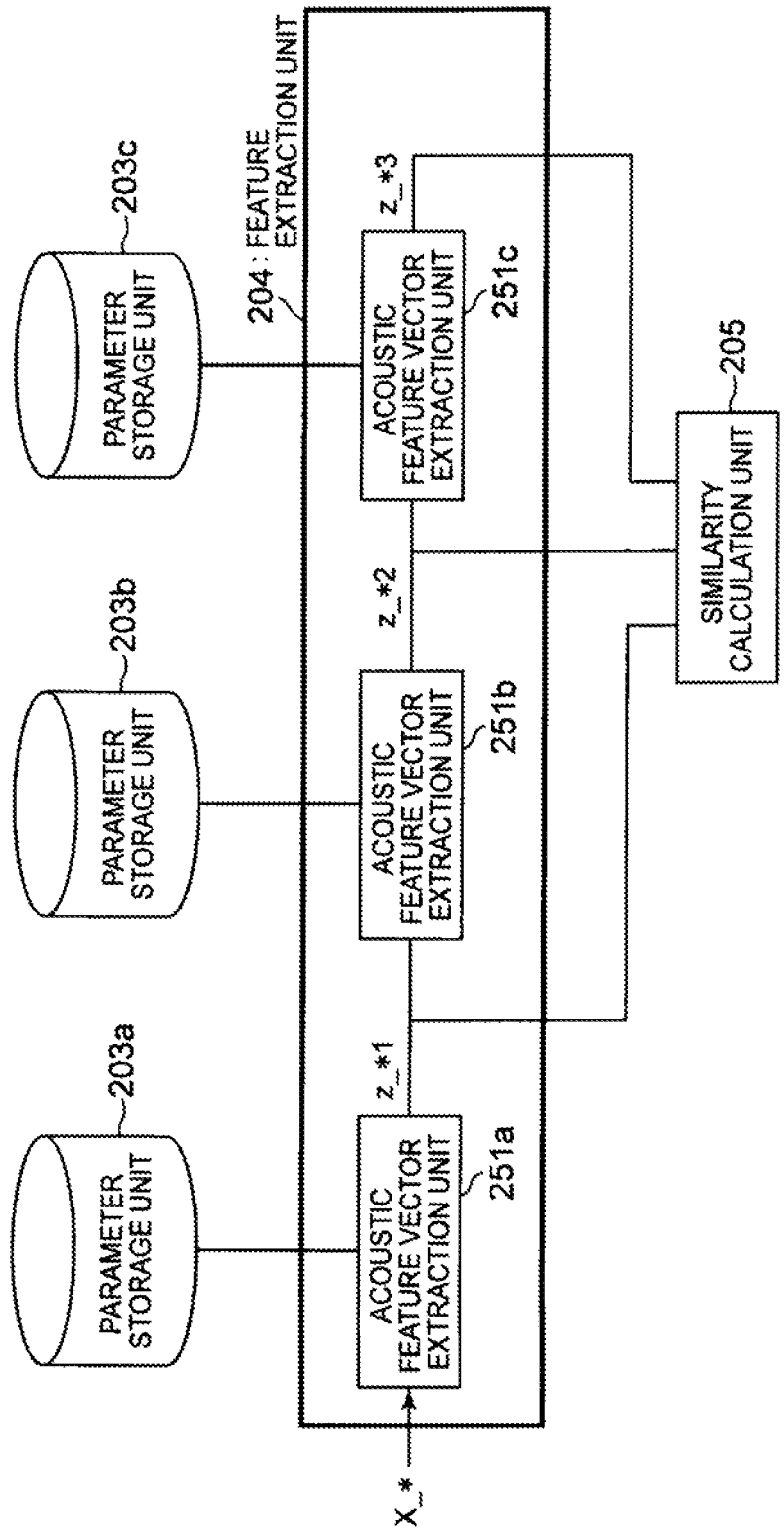
FIG. 9 It depicts a block diagram showing an example configuration of a feature extraction unit.

FIG. 9 is a block diagram showing an example configuration of the feature extraction unit 204. In FIG. 9, the parameter storage units 203a, 203b, 203c, and the similarity calculation unit 205 are also illustrated with the feature extraction unit 204.

The feature extraction unit 204 includes acoustic feature vector extraction unit 251 for each hierarchy. The acoustic feature vector extraction unit 251 corresponding to the highest hierarchy is represented by the sign "251" with the subscript "a" hereafter. Similarly, the acoustic feature vector extraction unit 251 corresponding to the second hierarchy is represented by the sign "251" with the subscript "b", and the acoustic feature vector extraction unit 251 corresponding to the third hierarchy is represented by the sign "251" with the subscript "c".

The acoustic feature vector extraction unit 251 of each hierarchy extracts an acoustic feature vector of the hierarchy of the acoustic feature vector extraction unit 251 itself, from the given acoustic pattern X_* or the acoustic feature vector extracted by the acoustic feature vector extraction unit of one higher hierarchy.

Specifically, the acoustic feature vector extraction unit 251a of the highest hierarchy extracts the acoustic feature vector z_*1 from the given acoustic pattern X_* using the parameters in the highest hierarchy (parameters stored in parameter storage unit 203a). The acoustic pattern X_* is an acoustic pattern whose label of the corresponding acoustic event is unknown. The acoustic feature vector z_*1 is the acoustic feature vector of the highest hierarchy. The acoustic feature vector extraction unit 251a sends the acoustic feature vector z_*1 to the similarity calculation unit 205, and also to the acoustic feature vector extraction unit 251b of one lower hierarchy.

The acoustic feature vector extraction unit 251 of each hierarchy other than the highest hierarchy (the acoustic feature vector extraction unit 251b is used as an example here) using parameters of the hierarchy of the acoustic feature vector extraction unit 251b (parameters stored in parameter storage unit 203b), extracts the acoustic feature vector z_*2 of the hierarchy of the acoustic feature vector extraction unit 251b from the acoustic feature vector z_*1 extracted by the acoustic feature vector extraction unit 251a of one higher hierarchy than the acoustic feature vector extraction unit 251b. The acoustic feature vector extraction unit 251b sends the acoustic feature vector z_*2 to the similarity calculation unit 205, and to the acoustic feature vector extraction unit 251c of one lower hierarchy.

Here, the acoustic feature vector extraction unit 251b is described as an example of the acoustic feature vector extraction unit 251 other than the highest hierarchy, and the operation of the acoustic feature vector extraction unit 251c is similar. However, if the acoustic feature vector extraction unit 251 of one lower hierarchy does not exist, it is not necessary to send the acoustic feature vector to the acoustic feature vector extraction unit 251 of one lower hierarchy.

For example, the learning unit 201, including the acoustic feature vector extraction unit 211a, 211b, 211c, the language vector calculation unit 212a, 212b, 212c, the similarity calculation unit 213a, 213b, 213c, and the parameter update unit 214a, 214b, 214c, is realized by a CPU of a computer that operates according to a learning program. In this case, for example, the CPU may read the learning program from a program recording medium such as a program storage device of the computer, and operate as the learning unit 201 that includes the acoustic feature vector extraction unit 211a, 211b, 211c, the language vector calculation unit 212a, 212b, 212c, the similarity calculation unit 213a, 213b, 213c, and the parameter update unit 214a, 214b, 214c.

For example, the feature extraction unit 204 including the acoustic feature vector extraction unit 251a, 251b, 251c, the similarity calculation unit 205, and the identification unit 206, are realized by a CPU of a computer that operates according to a pattern recognition program. In this case, for example, the CPU may read the pattern recognition program from a program recording medium such as a program storage device of the computer, and operate as the feature extraction unit 204, the similarity calculation unit 205, and the identification unit 206 according to the pattern recognition program.

The parameter storage units 203a, 203b, 203c and the language vector model storage unit 102 are realized, for example, by a storage unit included in the computer.

Figure 10:
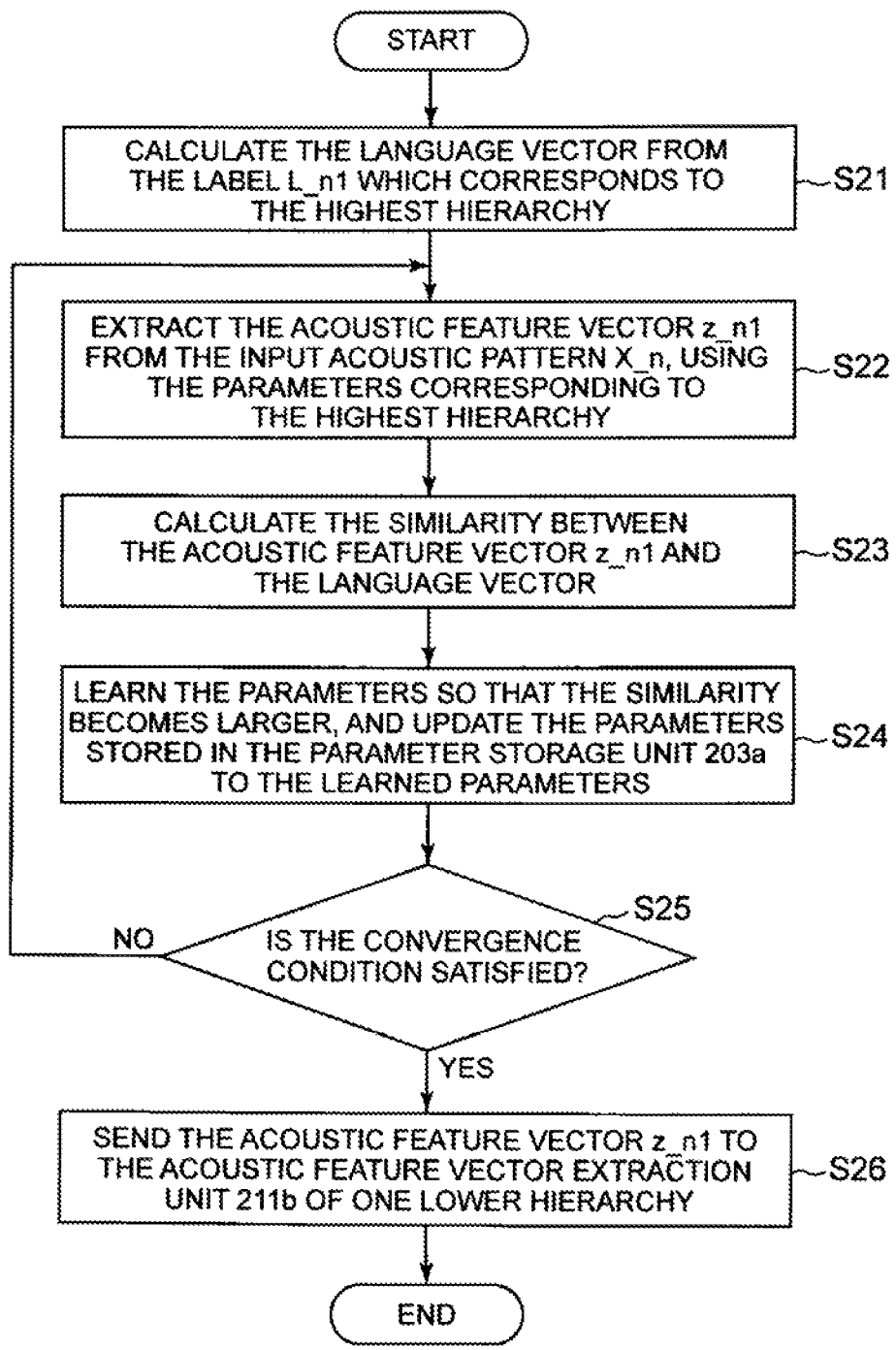
FIG. 10 It depicts a flowchart showing an example of the processing progress of elements corresponding to one hierarchy in the learning unit in the case of focusing on the one hierarchy.

Next, the processing progress of the second exemplary embodiment will be described. FIG. 10 is a flowchart showing an example of the processing progress of elements corresponding to one hierarchy in the learning unit 201 in the case of focusing on the one hierarchy. In FIG. 10, an example of the case of focusing on the highest hierarchy is shown. The matters already described will not be described in detail. It is assumed that the parameter storage units 203a, 203b, and 203b stores the predetermined initial values of the parameters, respectively.

In addition, it is assumed that a pair of an acoustic pattern X_n and a label L_n={L_n1, L_n2, L_n3} corresponding to the acoustic pattern X_n has been input to the learning unit 201.

Based on the language vector model, the language vector calculation unit 212a calculates the language vector from the label L_n1 which corresponds to the highest hierarchy (step S21).

The acoustic feature vector extraction unit 211a extracts the acoustic feature vector z_n1 from the input acoustic pattern X_n, using the parameters corresponding to the highest hierarchy (parameters stored in the parameter storage unit 203a) (step S22).

Next, the similarity calculation unit 213a calculates the similarity between the acoustic feature vector z_n1 extracted in step S22 and the language vector calculated in step S21 (step S23).

The parameter update unit 214a learns the parameters so that the similarity calculated by the similarity calculation unit 213a becomes larger, and updates the parameters stored in the parameter storage unit 203a to the learned parameters (step S24).

The parameter update unit 214a then determines whether the convergence condition is satisfied or not (step S25). If the convergence condition is not satisfied (No in step S25), the process of steps S22 to S25 is repeated. If the convergence condition is satisfied (Yes in step S25), the acoustic feature vector extraction unit 211a sends the acoustic feature vector z_n1 extracted in the most recent step S22 to the acoustic feature vector extraction unit 211b of one lower hierarchy (step S26) and ends the process.

In each hierarchy other than the highest hierarchy, the same processing is performed as in steps S21-S26. However, in each hierarchy other than the highest hierarchy, the acoustic feature vector extraction unit 211 extracts an acoustic feature vector from the acoustic feature vector extracted in one higher hierarchy than the hierarchy, using the parameters corresponding to the hierarchy of the acoustic feature vector extraction unit 211, as a process corresponding to step S22. As for the other points, the same as in steps S21-S26.

Next, the processing progress of identifying the label of an acoustic event according to an acoustic pattern X_* whose label of the corresponding acoustic event is unknown will be described. It is assumed that the parameter storage units 203a, 203b, 203c stores the parameters updated by the learning unit 201, respectively.

When the acoustic pattern X_* is input to the feature extraction unit 204, the acoustic feature vector extraction unit 251a corresponding to the highest hierarchy extracts the acoustic feature vector z_*1 from the acoustic pattern X_* using the parameters corresponding to the highest hierarchy (parameters stored in the parameter storage unit 203a). The acoustic feature vector extraction unit 251a sends the acoustic feature vector z_*1 to the acoustic feature vector extraction unit 251b of one lower hierarchy, and to the similarity calculation unit 205.

The acoustic feature vector extraction unit 251b of the second hierarchy extracts the acoustic feature vector z_*2 from the acoustic feature vector z_*1 extracted in one higher hierarchy, using the parameters corresponding to the hierarchy (parameters stored in parameter storage unit 203b). The acoustic feature vector extraction unit 251b sends the acoustic feature vector z_*2 to the acoustic feature vector extraction unit 251c of one lower hierarchy, and to the similarity calculation unit 205.

The acoustic feature vector extraction unit 251 of the third and subsequent hierarchies performs similar processing. If the acoustic feature vector extraction unit 251 of one lower hierarchy does not exist, the acoustic feature vector may be sent to the similarity calculation unit 205. In the example shown in FIG. 9, the acoustic feature vector extraction unit 251c may send the acoustic feature vector z_*3, extracted from the acoustic feature vector z_*2, to the similarity calculation unit 205.

As a result, the similarity calculation unit 205 obtains the acoustic feature vectors z_*1, z_*2, z_*3, extracted in each hierarchy. After this, the similarity calculation unit 205 and the identification unit 206 (see FIG. 7) may perform the same processing as steps S12-S14 (see FIG. 4) in the first exemplary embodiment, for each hierarchy. Steps S12 to S14 are described in the first exemplary embodiment, so they are not described here. In the case of executing the same processing for each hierarchy as steps S12-S14 in the first exemplary embodiment, the similarity calculation unit 205 and the identification unit 206 may execute the processing for each hierarchy in parallel.

According to the second exemplary embodiment, the acoustic feature vector z_n1 extracted by the acoustic feature vector extraction unit 211a of the highest hierarchy is an acoustic feature vector that reflects, for example, the semantic difference from "human voice" and "music" in the aforementioned example. And in the second hierarchy, the acoustic feature vector z_n2 extracted from the acoustic feature vector z_n1 is an acoustic feature vector that reflects, for example, the semantic difference from "male voice" and "female voice" in the aforementioned examples.

Thus, in the second exemplary embodiment, the acoustic feature vectors extracted for each hierarchy in the learning unit 201 are more prominent for the semantic differences that the different labels have. The same is true for the acoustic feature vectors extracted for each hierarchy in the feature extraction unit 204. Thus, in the second exemplary embodiment, parameters that can further improve the identification accuracy of acoustic events can be learned for each hierarchy. Moreover, from the given acoustic pattern, acoustic event can be identified for each hierarchy with higher accuracy.

Next, modification examples of the second exemplary embodiment are described. Similar to the modification example of the first exemplary embodiment, the pattern recognition system 200 (see FIG. 7) need not include the similarity calculation unit 205. In this case, since the similarity calculation unit 205 is not provided, the similarity vector for each hierarchy is not generated.

In this case, the identification unit 206 may identify the label of the acoustic event by applying the acoustic feature vector to the discriminator for each hierarchy. For example, the identification unit 206 may identify the label of the highest hierarchy by applying the acoustic feature vector z_*1 of the highest hierarchy to the discriminator. The identification unit 206 may identify the label for each of the other hierarchies in the same way. The discriminator may also be learned in advance by machine learning for each hierarchy. Other points are similar to the second exemplary embodiment.

In this case, the same effect as above can be achieved.

Also, in the second exemplary embodiment, the learning device and the pattern recognition device may be independent devices, respectively.

Figure 11:
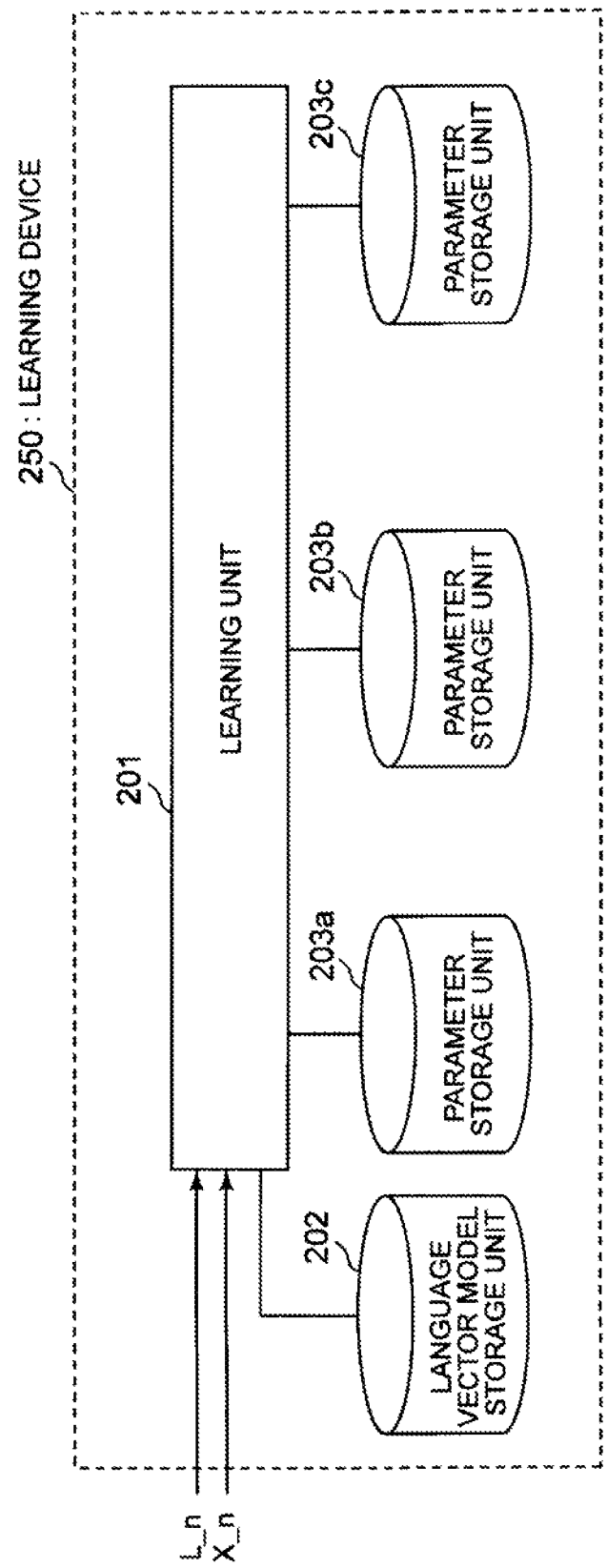
FIG. 11 It depicts a block diagram showing an example of a case where the learning device is configured as a separate device from the pattern recognition device, in the second exemplary embodiment.

FIG. 11 is a block diagram showing an example of a case where the learning device is configured as a separate device from the pattern recognition device, in the second exemplary embodiment. Elements similar to those shown in FIG. 7 are marked with the same sign as in FIG. 7 and the description will be omitted. The learning device 250 includes a learning unit 201, a language vector model storage unit 202, and parameter storage units 203a, 203b, 203c. The learning unit 201 includes, for each hierarchy, an acoustic feature vector extraction unit 211, a language vector calculation unit 212, a similarity calculation unit 213, and a parameter update unit 214, as shown in FIG. 8. These elements are the same as each of the elements described in the second exemplary embodiment above and the description will be omitted. The learning device 250 can also learn parameters that can further improve the identification accuracy of acoustic events for each hierarchy.

Figure 12:
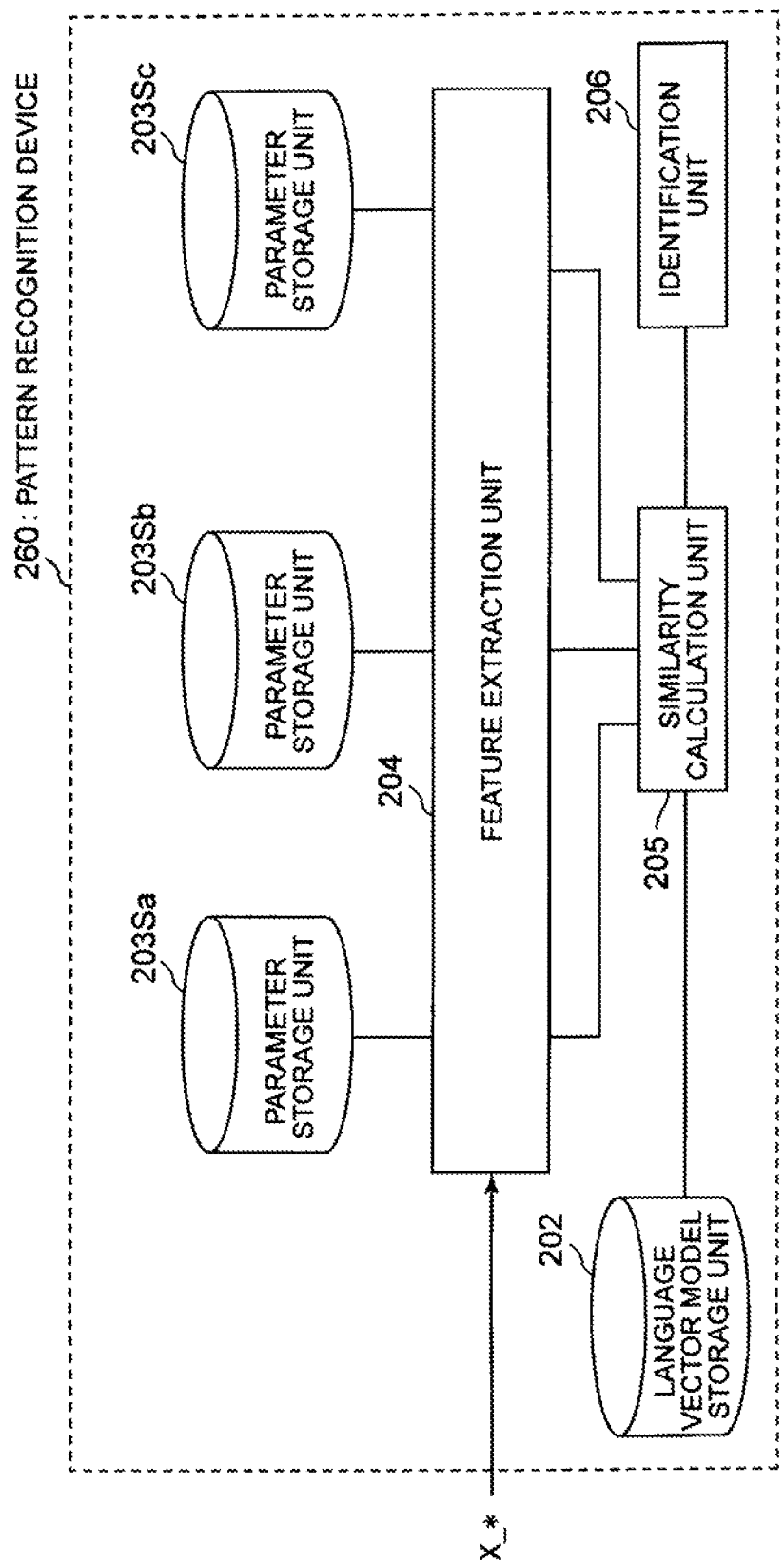
FIG. 12 It depicts a block diagram showing an example of a case where the pattern recognition device is configured as a separate device from the learning device, in the second exemplary embodiment.

FIG. 12 is a block diagram showing an example of a case where the pattern recognition device is configured as a separate device from the learning device, in the second exemplary embodiment. Elements similar to those shown in FIG. 7 are marked with the same sign as in FIG. 7 and the description will be omitted. The pattern recognition device 260 includes a feature extraction unit 204, a similarity calculation unit 205, an identification unit 206, a parameter storage units 203Sa, 203Sb, 203Sc, and a language vector model storage unit 202. The parameter storage units 203Sa, 203Sb, 203Sc are storage devices that store the parameters learned by the learning device. For example, the parameters learned by the learning device 250 (see FIG. 11) and stored in the parameter storage units 203*a*, 203*b*, 203*c* shown in FIG. 11 may be copied to the parameter storage units 203Sa, 203Sb, 203Sc of the pattern recognition device 260, respectively. The feature extraction unit 204 also includes an acoustic feature vector extraction unit 251 for each hierarchy, as shown in FIG. 9. The pattern recognition device 260 can also identify an acoustic event from a given acoustic pattern for each hierarchy, with a higher accuracy.

In addition, as already explained, the number of hierarchies is not limited to 3.

Each exemplary embodiment of the present invention was described using acoustic signals as an example. The present invention can be applied to any signal, such as a time-series vibration signal obtained from a vibration sensor.

Figure 13:
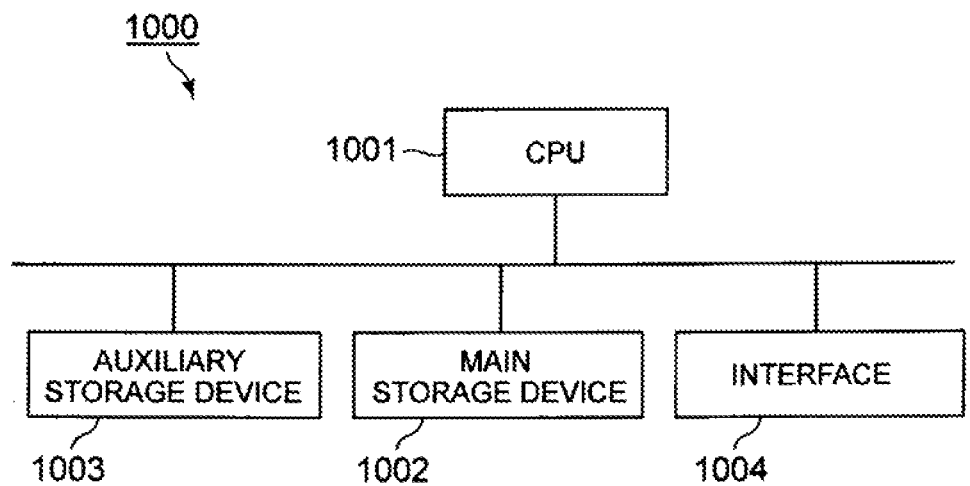
FIG. 13 It depicts a schematic block diagram showing an example of a computer configuration for a pattern recognition system in each exemplary embodiment.

FIG. 13 is a schematic block diagram showing an example of a computer configuration for a pattern recognition system (which may be an independent learning device or an independent pattern recognition device) in each exemplary embodiment. A computer 1000 includes a CPU 1001, a main storage device 1002, an auxiliary storage device 1003, and an interface 1004.

The pattern recognition system in each exemplary embodiment (which may be an independent learning device or an independent pattern recognition device) is implemented in the computer 1000, and its operation is stored in the auxiliary storage device 1003 in the form of a program. The CPU 1001 reads the program from the auxiliary storage 1003 and loads it in the main storage 1002, and in accordance with the program, the CPU 1001 executes the processing described in each of the aforementioned exemplary embodiments or their modification examples.

The auxiliary storage device 1003 is an example of a non-transitory, tangible medium. Other examples of non-transitory tangible medium include a magnetic disk, a magneto-optical disk, a CD-ROM (Compact Disk Read Only Memory), a DVD-ROM (Digital Versatile Disk Read Only Memory), a semiconductor memory, and the like. When the program is delivered to a computer 1000 through a communication line, the computer 1000 that has received the delivery may load the program in the main storage device 1002 and execute the processing described above.

The program may also be for implementing a part of the process mentioned above. Furthermore, the program may be a differential program that implements the process described above in combination with another program already stored in the auxiliary storage device 1003.

Also, some or all of each constituent element may be realized by general-purpose or dedicated circuitry, a processor, or the like, or a combination of these. They may be configured by a single chip or by multiple chips connected via a bus. Some or all of each constituent element may be realized by a combination of the above-mentioned circuits, etc. and programs.

When some or all of each constituent element is realized by a plurality of information processing devices, circuits and the like, the plurality of information processing devices, circuits and the like may be centrally located or distributed. For example, the information processing devices and circuits may be realized as a client-and-server system, a cloud computing system, and so on, each of which is connected via a communication network.

Figure 14:
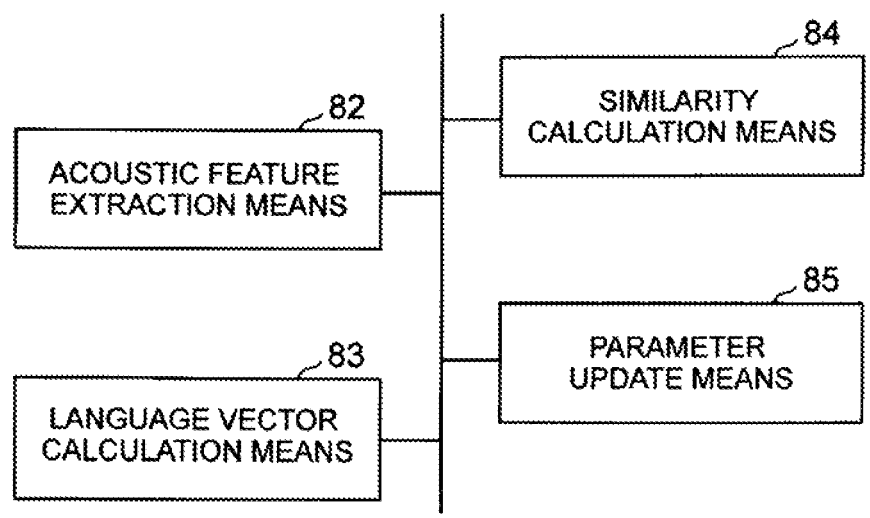
FIG. 14 It depicts a block diagram showing an outline of the learning device of the present invention.

Next, an outline of the present invention will be described. FIG. 14 is a block diagram showing an outline of the learning device of the present invention. The learning device of the present invention includes acoustic feature extraction means 82, language vector calculation means 83, similarity calculation means 84, and parameter update means 85.

The acoustic feature extraction means 82 (e.g., the acoustic feature vector extraction unit 111, the acoustic feature vector extraction unit 211*a*, 211*b*, 211*c*) extracts an acoustic feature (e.g., an acoustic feature vector), using predetermined parameters, from an acoustic pattern obtained as a result of processing on an acoustic signal.

The language vector calculation means 83 (e.g., the language vector calculation unit 112, the language vector calculation unit 212*a*, 212*b*, 212*c*) calculates a language vector from a given label that represents an attribute (e.g., acoustic event) of the source of the acoustic signal and that is associated with the acoustic pattern.

The similarity calculation means 84 (e.g., the similarity calculation unit 113, the similarity calculation unit 213*a*, 213*b*, 213*c*) calculates a similarity between the acoustic feature and the language vector.

The parameter update means 85 (e.g., the parameter update unit 114, the parameter update unit 214*a*, 214*b*, 214*c*) learns parameters so that the similarity becomes larger, and updates the predetermined parameters to the parameters obtained by learning.

With such a configuration, parameters that are used by a pattern recognition device that identifies acoustic event from acoustic pattern when extracting acoustic feature and that can improve the identification accuracy of acoustic event, can be learned.

Figure 15:
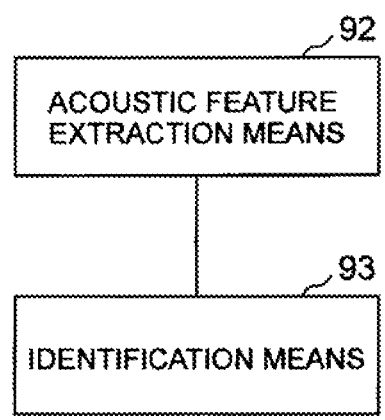
FIG. 15 It depicts a block diagram showing an outline of the pattern recognition device of the present invention.

FIG. 15 is a block diagram showing an outline of the pattern recognition device of the present invention. The pattern recognition device of the present invention includes acoustic feature extraction means 92 and identification means 93.

The acoustic feature extraction means 92 (e.g., the acoustic feature vector extraction unit 104, the acoustic feature vector extraction unit 251*a*, 251*b*, 251*c*) extracts an acoustic feature from an acoustic pattern using parameters for extracting the acoustic feature (e.g., acoustic feature vector) from the acoustic pattern, the parameters learned based on a pair of an acoustic pattern obtained as a result of processing on an acoustic signal and a label representing an attribute (e.g., acoustic event) of the source of the acoustic signal.

The identification means 93 (e.g., identification unit 106, identification unit 206) identifies a label representing the attributes of the source of the acoustic signal on which the acoustic pattern is based, based on the acoustic feature.

With such a configuration, an acoustic event can be identified with high accuracy from an acoustic patterns.

Each of the above-described exemplary embodiments of the present invention can be described as, but not limited thereto, the following supplementary note.

(Supplementary Note 1)

A learning device comprising:

acoustic feature extraction means that extracts an acoustic feature, using predetermined parameters, from an acoustic pattern obtained as a result of processing on an acoustic signal;

language vector calculation means that calculates a language vector from a given label that represents an attribute of a source of the acoustic signal and that is associated with the acoustic pattern;

similarity calculation means that calculates a similarity between the acoustic feature and the language vector; and parameter update means that learns parameters so that the similarity becomes larger, and updates the predetermined parameters to the parameters obtained by learning.

(Supplementary Note 2)

The learning device according to supplementary note 1, wherein the given label is defined for each hierarchy of category of the attribute of the source, wherein the learning device comprises, for each hierarchy of category, parameter storage means that stores the predetermined parameters;

the acoustic feature extraction means;

the language vector calculation means;

the similarity calculation means; and the parameter update means;

wherein the acoustic feature extraction means of the highest hierarchy extracts the acoustic feature from a given acoustic pattern, using parameters stored in the parameter storage means corresponding to the acoustic feature extraction means, the acoustic feature extraction means of each hierarchy other than the highest hierarchy extracts the acoustic feature of the hierarchy corresponding to the acoustic feature extraction means, from the acoustic feature extracted by the acoustic feature extraction means of one higher hierarchy, using parameters stored in the parameter storage means corresponding to the acoustic feature extraction means, the language vector calculation means of each hierarchy calculates the language vector from the label of the hierarchy corresponding to the language vector calculation means, the similarity calculation means of each hierarchy calculates the similarity between the acoustic feature extracted by the acoustic feature extraction means of the hierarchy corresponding to the similarity calculation means and the language vector calculated by the language vector calculation means of the hierarchy corresponding to the similarity calculation means, the parameter update means of each hierarchy learns the parameters of the hierarchy so that the similarity calculated by the similarity calculation means of the hierarchy corresponding to the parameter update means becomes larger, and updates the parameters stored in the parameter storage means of the hierarchy corresponding to the parameter update means to the parameters obtained by learning.

(Supplementary Note 3)

The learning device according to supplementary note 1 or 2, wherein the acoustic feature is a vector whose number of dimensions is equal to the number of dimensions of the language vector.

(Supplementary Note 4)

A pattern recognition device comprising:

acoustic feature extraction means that extracts an acoustic feature from an acoustic pattern using parameters for extracting the acoustic feature from the acoustic pattern, the parameters learned based on a pair of an acoustic pattern obtained as a result of processing on an acoustic signal and a label representing an attribute of a source of the acoustic signal; and identification means that identifies a label representing the attributes of the source of the acoustic signal on which the acoustic pattern is based, based on the acoustic feature.

(Supplementary Note 5)

The pattern recognition device according to supplementary note 4, further comprising:

similarity calculation means that holds a plurality of labels defined in advance as candidates for identification result, calculates, for each label, a language vector from the label, and calculates, for each label, a similarity between the language vector and the acoustic feature extracted by the acoustic feature extraction means;

wherein the identification means identifies the label representing the attributes of the source of the acoustic signal on which the acoustic pattern is based, based on the similarity calculated for each label.

(Supplementary Note 6)

The pattern recognition device according to supplementary note 4 or 5, wherein the pattern recognition device comprises, for each hierarchy, parameter storage means that stores the parameters that were learned based on a pair of the acoustic pattern obtained as a result of processing on the acoustic signal and the label defined for each hierarchy of category of the attribute of the source, and comprises the acoustic feature extraction means for each hierarchy, wherein the acoustic feature extraction means of the highest hierarchy extracts the acoustic feature from a given acoustic pattern, using parameters stored in the parameter storage means corresponding to the acoustic feature extraction means, the acoustic feature extraction means of each hierarchy other than the highest hierarchy extracts the acoustic feature of the hierarchy corresponding to the acoustic feature extraction means, from the acoustic feature extracted by the acoustic feature extraction means of one higher hierarchy, using parameters stored in the parameter storage means corresponding to the acoustic feature extraction means, and the identification means identifies the label for each hierarchy.

(Supplementary Note 7)

The pattern recognition device according to supplementary note 5, wherein the pattern recognition device comprises, for each hierarchy, parameter storage means that stores the parameters that were learned based on a pair of the acoustic pattern obtained as a result of processing on the acoustic signal and the label defined for each hierarchy of category of the attribute of the source, and comprises the acoustic feature extraction means for each hierarchy, wherein the acoustic feature extraction means of the highest hierarchy extracts the acoustic feature from a given acoustic pattern, using parameters stored in the parameter storage means corresponding to the acoustic feature extraction means, the acoustic feature extraction means of each hierarchy other than the highest hierarchy extracts the acoustic feature of the hierarchy corresponding to the acoustic feature extraction means, from the acoustic feature extracted by the acoustic feature extraction means of one higher hierarchy, using parameters stored in the parameter storage means corresponding to the acoustic feature extraction means, the similarity calculation means holds, for each hierarchy, the plurality of labels defined in advance as candidates for identification result, and calculates, for each hierarchy, the similarity for each label, and the identification means identifies the label for each hierarchy.

(Supplementary Note 8)

The pattern recognition device according to supplementary note 5 or 7, wherein the acoustic feature is a vector whose number of dimensions is equal to the number of dimensions of the language vector.

(Supplementary Note 9)

A learning method, implemented by a computer, comprising:

an acoustic feature extraction processing of extracting an acoustic feature, using predetermined parameters, from an acoustic pattern obtained as a result of processing on an acoustic signal;

a language vector calculation processing of calculating a language vector from a given label that represents an attribute of a source of the acoustic signal and that is associated with the acoustic pattern;

a similarity calculation processing of calculating a similarity between the acoustic feature and the language vector; and a parameter update processing of learning parameters so that the similarity becomes larger, and updating the predetermined parameters to the parameters obtained by learning.

(Supplementary Note 10)

The learning method according to supplementary note 9, wherein the given label is defined for each hierarchy of category of the attribute of the source, and for each hierarchy of category, parameter storage means that stores the predetermined parameters is provided;

wherein the computer performs, for each hierarchy of category, the acoustic feature extraction processing;

the language vector calculation processing;

the similarity calculation processing; and the parameter update processing, wherein the computer, in the acoustic feature extraction processing of the highest hierarchy, extracts the acoustic feature from a given acoustic pattern, using parameters stored in the parameter storage means corresponding to the acoustic feature extraction processing, in the acoustic feature extraction processing of each hierarchy other than the highest hierarchy, extracts the acoustic feature of the hierarchy corresponding to the acoustic feature extraction processing, from the acoustic feature extracted in the acoustic feature extraction processing of one higher hierarchy, using parameters stored in the parameter storage means corresponding to the acoustic feature extraction processing, in the language vector calculation processing of each hierarchy, calculates the language vector from the label of the hierarchy corresponding to the language vector calculation processing, in the similarity calculation processing of each hierarchy, calculates the similarity between the acoustic feature extracted in the acoustic feature extraction processing of the hierarchy corresponding to the similarity calculation processing and the language vector calculated in the language vector calculation processing of the hierarchy corresponding to the similarity calculation processing, and in the parameter update processing of each hierarchy, learns the parameters of the hierarchy so that the similarity calculated in the similarity calculation processing of the hierarchy corresponding to the parameter update processing becomes larger, and updates the parameters stored in the parameter storage means of the hierarchy corresponding to the parameter update processing to the parameters obtained by learning.

(Supplementary Note 11)

A pattern recognition method, implemented by a computer, comprising:

an acoustic feature extraction processing of extracting an acoustic feature from an acoustic pattern using parameters for extracting the acoustic feature from the acoustic pattern, the parameters learned based on a pair of an acoustic pattern obtained as a result of processing on an acoustic signal and a label representing an attribute of a source of the acoustic signal; and an identification processing of identifying a label representing the attributes of the source of the acoustic signal on which the acoustic pattern is based, based on the acoustic feature.

(Supplementary Note 12)

The pattern recognition method according to supplementary note 11, wherein the computer holds a plurality of labels defined in advance as candidates for identification result, performs a similarity calculation processing of calculating, for each label, a language vector from the label, and calculating, for each label, a similarity between the language vector and the acoustic feature extracted in the acoustic feature extraction processing; and in the identification processing, identifies the label representing the attributes of the source of the acoustic signal on which the acoustic pattern is based, based on the similarity calculated for each label.

(Supplementary Note 13)

The pattern recognition method according to supplementary note 11 or 12, wherein the computer that comprises, for each hierarchy, parameter storage means that stores the parameters that were learned based on a pair of the acoustic pattern obtained as a result of processing on the acoustic signal and the label defined for each hierarchy of category of the attribute of the source, performs the acoustic feature extraction processing for each hierarchy, in the acoustic feature extraction processing of the highest hierarchy, extracts the acoustic feature from a given acoustic pattern, using parameters stored in the parameter storage means corresponding to the acoustic feature extraction processing, in the acoustic feature extraction processing of each hierarchy other than the highest hierarchy, extracts the acoustic feature of the hierarchy corresponding to the acoustic feature extraction processing, from the acoustic feature extracted in the acoustic feature extraction processing of one higher hierarchy, using parameters stored in the parameter storage means corresponding to the acoustic feature extraction processing, and in the identification processing, identifies the label for each hierarchy.

(Supplementary Note 14)

The pattern recognition method according to supplementary note 12, wherein the computer that comprises, for each hierarchy, parameter storage means that stores the parameters that were learned based on a pair of the acoustic pattern obtained as a result of processing on the acoustic signal and the label defined for each hierarchy of category of the attribute of the source, performs the acoustic feature extraction processing for each hierarchy, in the acoustic feature extraction processing of the highest hierarchy, extracts the acoustic feature from a given acoustic pattern, using parameters stored in the parameter storage means corresponding to the acoustic feature extraction processing, in the acoustic feature extraction processing of each hierarchy other than the highest hierarchy, extracts the acoustic feature of the hierarchy corresponding to the acoustic feature extraction processing, from the acoustic feature extracted in the acoustic feature extraction processing of one higher hierarchy, using parameters stored in the parameter storage means corresponding to the acoustic feature extraction processing, holds, for each hierarchy, the plurality of labels defined in advance as candidates for identification result, and in the similarity calculation processing, calculates, for each hierarchy, the similarity for each label, and in the identification processing, identifies the label for each hierarchy.

(Supplementary Note 15)

A learning program causing a computer to perform:

an acoustic feature extraction processing of extracting an acoustic feature, using predetermined parameters, from an acoustic pattern obtained as a result of processing on an acoustic signal;

a language vector calculation processing of calculating a language vector from a given label that represents an attribute of a source of the acoustic signal and that is associated with the acoustic pattern;

a similarity calculation processing of calculating a similarity between the acoustic feature and the language vector; and a parameter update processing of learning parameters so that the similarity becomes larger, and updating the predetermined parameters to the parameters obtained by learning.

(Supplementary Note 16)

The learning program according to supplementary note 15, wherein the given label is defined for each hierarchy of category of the attribute of the source, and the computer comprises, for each hierarchy of category, parameter storage means that stores the predetermined parameters, wherein the learning program causes the computer to perform, for each hierarchy of category, the acoustic feature extraction processing;

the language vector calculation processing;

the similarity calculation processing; and the parameter update processing, wherein the learning program causes the computer, in the acoustic feature extraction processing of the highest hierarchy, to extract the acoustic feature from a given acoustic pattern, using parameters stored in the parameter storage means corresponding to the acoustic feature extraction processing, in the acoustic feature extraction processing of each hierarchy other than the highest hierarchy, to extract the acoustic feature of the hierarchy corresponding to the acoustic feature extraction processing, from the acoustic feature extracted in the acoustic feature extraction processing of one higher hierarchy, using parameters stored in the parameter storage means corresponding to the acoustic feature extraction processing, in the language vector calculation processing of each hierarchy, to calculate the language vector from the label of the hierarchy corresponding to the language vector calculation processing, in the similarity calculation processing of each hierarchy, to calculate the similarity between the acoustic feature extracted in the acoustic feature extraction processing of the hierarchy corresponding to the similarity calculation processing and the language vector calculated in the language vector calculation processing of the hierarchy corresponding to the similarity calculation processing, and in the parameter update processing of each hierarchy, to learn the parameters of the hierarchy so that the similarity calculated in the similarity calculation processing of the hierarchy corresponding to the parameter update processing becomes larger, and to update the parameters stored in the parameter storage means of the hierarchy corresponding to the parameter update processing to the parameters obtained by learning.

(Supplementary Note 17)

A pattern recognition program causing a computer to perform:

an acoustic feature extraction processing of extracting an acoustic feature from an acoustic pattern using parameters for extracting the acoustic feature from the acoustic pattern, the parameters learned based on a pair of an acoustic pattern obtained as a result of processing on an acoustic signal and a label representing an attribute of a source of the acoustic signal; and an identification processing of identifying a label representing the attributes of the source of the acoustic signal on which the acoustic pattern is based, based on the acoustic feature.

(Supplementary Note 18)

The pattern recognition program according to supplementary note 17, wherein the computer holds a plurality of labels defined in advance as candidates for identification result, wherein the pattern recognition program causes the computer to perform a similarity calculation processing of calculating, for each label, a language vector from the label, and calculating, for each label, a similarity between the language vector and the acoustic feature extracted in the acoustic feature extraction processing; and in the identification processing, to identify the label representing the attributes of the source of the acoustic signal on which the acoustic pattern is based, based on the similarity calculated for each label.

(Supplementary Note 19)

The pattern recognition program according to supplementary note 17 or 18, wherein the computer comprises, for each hierarchy, parameter storage means that stores the parameters that were learned based on a pair of the acoustic pattern obtained as a result of processing on the acoustic signal and the label defined for each hierarchy of category of the attribute of the source, wherein the pattern recognition program causes the computer to perform the acoustic feature extraction processing for each hierarchy, in the acoustic feature extraction processing of the highest hierarchy, to extract the acoustic feature from a given acoustic pattern, using parameters stored in the parameter storage means corresponding to the acoustic feature extraction processing, in the acoustic feature extraction processing of each hierarchy other than the highest hierarchy, to extract the acoustic feature of the hierarchy corresponding to the acoustic feature extraction processing, from the acoustic feature extracted in the acoustic feature extraction processing of one higher hierarchy, using parameters stored in the parameter storage means corresponding to the acoustic feature extraction processing, in the identification processing, to identify the label for each hierarchy.

(Supplementary Note 20)

The pattern recognition program according to supplementary note 18 wherein the computer comprises, for each hierarchy, parameter storage means that stores the parameters that were learned based on a pair of the acoustic pattern obtained as a result of processing on the acoustic signal and the label defined for each hierarchy of category of the attribute of the source, wherein the pattern recognition program causes the computer to perform the acoustic feature extraction processing for each hierarchy, in the acoustic feature extraction processing of the highest hierarchy, to extract the acoustic feature from a given acoustic pattern, using parameters stored in the parameter storage means corresponding to the acoustic feature extraction processing, in the acoustic feature extraction processing of each hierarchy other than the highest hierarchy, to extract the acoustic feature of the hierarchy corresponding to the acoustic feature extraction processing, from the acoustic feature extracted in the acoustic feature extraction processing of one higher hierarchy, using parameters stored in the parameter storage means corresponding to the acoustic feature extraction processing, wherein the computer holds, for each hierarchy, the plurality of labels defined in advance as candidates for identification result, wherein the pattern recognition program causes the computer in the similarity calculation processing, to calculate, for each hierarchy, the similarity for each label, and in the identification processing, to identify the label for each hierarchy.

Although the present invention has been described with reference to the exemplary embodiments, the present invention is not limited to the above-described exemplary embodiments. Various modifications that can be understood by those skilled in the art can be made to the configurations and details of the present invention within the scope of the present invention.

INDUSTRIAL APPLICABILITY

The present invention is suitably applied to a learning device that learns parameters for extracting an acoustic feature from an acoustic pattern obtained as a result of processing on an acoustic signal, and to a pattern recognition device that identifies the source of an acoustic signal on which a given acoustic pattern is based.

REFERENCE SIGNS LIST

101, 201 Learning unit
102, 202 Language vector model storage unit
103, 203a, 203b, 203c Parameter storage unit
104, 251a, 251b, 251c Acoustic feature vector extraction unit
105, 205 Similarity calculation unit
106, 206 Identification unit
111, 211a, 211b, 211c Acoustic feature vector extraction unit
112, 212a, 212b, 212c Language vector calculation unit
113, 213a, 213b, 213c Similarity calculation unit
114, 214a, 214b, 214c Parameter update unit

What is claimed is:

1. A learning device comprising:
a processor; and
a memory storing instructions executable by the processor to:
store, for each of a plurality of category hierarchies including a highest category hierarchy, predetermined parameters;
extract, for the highest category hierarchy, an acoustic feature, using the predetermined parameters corresponding to the highest category hierarchy, from an acoustic pattern obtained as a result of processing on an acoustic signal;
extract, for each category hierarchy other than the highest category hierarchy, the acoustic feature, using the predetermined parameters corresponding to the category hierarchy, from the acoustic feature extracted from the category hierarchy that is one level higher;
calculate, for each category hierarchy, a language vector from a given label corresponding to the category hierarchy and that represents an attribute of a source of the acoustic signal and that is associated with the acoustic pattern;

calculate, for each category hierarchy, a similarity between the acoustic feature and the language vector; and learn, for each category hierarchy, parameters so that the similarity becomes larger, and update the predetermined parameters to the parameters obtained by learning.

2. The learning device according to claim 1, wherein the acoustic feature is a vector having a number of dimensions equal to a number of dimensions of the language vector.

3. A pattern recognition device comprising:
a processor; and
a memory storing instructions executable by the processor to:
store, for each of a plurality of category hierarchies including a highest category hierarchy, predetermined parameters;
extract, for the highest category hierarchy, an acoustic feature from an acoustic pattern obtained as a result of processing on an acoustic signal, using parameters corresponding to the highest category hierarchy, the parameters learned based on a pair of a learning acoustic pattern obtained as a result of processing on a learning acoustic signal and a learning label representing a learning attribute of a learning source of the learning acoustic signal;
extract, for each category hierarchy other than the highest category hierarchy, the acoustic feature, using the predetermined parameters corresponding to the category hierarchy, from the acoustic feature extracted from the category hierarchy that is one level higher;
identify, for each category hierarchy, a label representing an attribute of the source of the acoustic signal and that is associated with the acoustic pattern is based, based on the acoustic feature.

4. The pattern recognition device according to claim 3, wherein the instructions are executable by the processor to further:
store a plurality of labels defined in advance as identification candidates; and
calculate, for each identification candidate, a language vector from the identification candidate, and a similarity between the language vector and the acoustic feature extracted for each category hierarchy,
wherein
the label for each category hierarchy is identified based on the similarity calculated between the language vector for each identification candidate and the acoustic feature extracted for the category hierarchy.

5. The pattern recognition device according to claim 4, wherein the plurality of labels defined in advance are stored as the identification candidates for each category hierarchy.

6. The pattern recognition device according to claim 4, wherein the acoustic feature is a vector having a number of dimensions equal to a number of dimensions of the language vector.

7. A learning method, implemented by a computer, comprising:
storing, for each of a plurality of category hierarchies including a highest category hierarchy, predetermined parameters;
extracting, for the highest category hierarchy, an acoustic feature, using predetermined parameters corresponding to the highest category hierarchy, from an acoustic pattern obtained as a result of processing on an acoustic signal;
extracting, for each category hierarchy other than the highest category hierarchy, the acoustic feature, using the predetermined parameters corresponding to the category hierarchy, from the acoustic feature extracted from the category hierarchy that is one level higher;
calculating, for each category hierarchy, a language vector from a given label corresponding to the category hierarchy and that represents an attribute of a source of the acoustic signal and that is associated with the acoustic pattern;
calculating, for each category hierarchy, a similarity between the acoustic feature and the language vector; and
learning, for each category hierarchy, parameters so that the similarity becomes larger, and update the predetermined parameters to the parameters obtained by learning.

* * * * *